US006384711B1

(12) United States Patent
Cregger et al.

(10) Patent No.: US 6,384,711 B1
(45) Date of Patent: May 7, 2002

(54) ELECTRONIC LOCK IN CYLINDER OF STANDARD LOCK

(75) Inventors: Barton B. Cregger, Richmond; Lance G. Schoell, Roanoke; Stanley D. Kingma, Christiansburg; Matthew O. Schroeder, Roanoke, all of VA (US)

(73) Assignee: Medeco Security Locks, Inc., Salem, VA (US)

(*) Notice: Subject to any disclaimer, the term of this patent is extended or adjusted under 35 U.S.C. 154(b) by 0 days.

(21) Appl. No.: 09/186,098

(22) Filed: Nov. 5, 1998

Related U.S. Application Data

(60) Provisional application No. 60/064,547, filed on Nov. 5, 1997.

(51) Int. Cl.[7] .......................... G05B 19/00; E05B 47/00

(52) U.S. Cl. ......................................... 340/5.65; 70/277

(58) Field of Search ................................ 340/5.2, 5.65, 340/5.73, 5.25, 5.33; 70/278, 277, 278.2, 3, 280, 208, 283.1, 287, 360, 367, 490, 494, 222–224, 422, 472

(56) References Cited

U.S. PATENT DOCUMENTS

| | | | | |
|---|---|---|---|---|
| 2,278,044 A | | 3/1942 | Scanlan | |
| 2,691,436 A | | 10/1954 | Lowenstein et al. | |
| 2,962,139 A | | 11/1960 | Straub | |
| 3,176,754 A | | 4/1965 | Macios | |
| 3,748,878 A | | 7/1973 | Balzano et al. | |
| 4,167,104 A | | 9/1979 | Bond | |
| 4,676,083 A | | 6/1987 | Sedley et al. | |
| 4,716,922 A | | 1/1988 | Camp | |
| 4,854,143 A | | 8/1989 | Corder et al. | |
| 4,856,310 A | | 8/1989 | Parienti | |
| 4,909,053 A | | 3/1990 | Zipf, III et al. | |
| 5,000,018 A | | 3/1991 | Eisermann | |
| 5,088,347 A | | 2/1992 | Wanlass | |
| 5,140,317 A | | 8/1992 | Hyatt, Jr. et al. | |
| 5,212,972 A | | 5/1993 | Kincaid et al. | |
| 5,263,348 A | | 11/1993 | Wittwer | |
| 5,337,588 A | * | 8/1994 | Chhatwal | 70/278 |
| 5,552,777 A | | 9/1996 | Gokcebay et al. | |

FOREIGN PATENT DOCUMENTS

| | | |
|---|---|---|
| EP | 0312123 | 8/1986 |
| JP | 9618014 | 6/1996 |
| WO | 9321712 | 10/1993 |

* cited by examiner

*Primary Examiner*—Michael Horabik
*Assistant Examiner*—William Bangachon

(57) ABSTRACT

An electronic security system includes an electronic lock mechanism and an electronic key, each of which is provided with a microprocessor controller and a memory storing data including an ID code and encryption key codes. The electronic lock security system preferably includes an electronic lock including a hollow cylinder, an opening into the cylinder, a bolt movable through the opening between an extended position and a retracted position, a cam member within the cylinder, the cam member contacting the bolt to move the bolt to an unlocked position, a solenoid within the hollow cylinder, the solenoid being engageable with the cam member, an electronic lock circuit within the hollow cylinder, a plug connected to the solenoid for rotating the solenoid, the plug having a keyway for insertion of a key for rotating the plug. In addition, the system also includes an electronic key insertable within the keyway for communicating with the electronic lock circuit to operate the lock. A torque transmitting solenoid is used in the system.

21 Claims, 19 Drawing Sheets

ELECTRONIC LOCK IN CYLINDER OF STANDARD LOCK

This application claims priority from prior provisional application serial no. 60/064,547, filed Nov. 5, 1997.

BACKGROUND OF THE INVENTION

1. Field of the Invention

This invention relates generally to electronic security systems, and more particularly to electronic security systems for money-containing devices such as vending machines, etc., which must be periodically accessed by a collector in order to retrieve the funds accumulated in the device or by technicians to perform service and maintenance.

2. Background and Prior Art

Typically, the collection of money from coin or currency operated devices such as pay telephones, transit system fare card machines or the like is a costly and burdensome operation. For instance, a company may own tens or even hundreds of thousands of pay telephones for which tens or hundreds of thousands of keys must be kept in order to prevent the loss of a key from requiring the changing of locks on thousands of devices which would operate with the lost key.

Another problem involved with the collection of funds from currency operated devices is the possibility of fraud or theft by a collector. In some cases, a collector should remove a locked coin box from the device and replace it with an empty lock box to which he does not have access. However, it is possible that a removed coin box will not be replaced with another lock box but rather will be replaced with an unlocked receptacle which can be later removed by that collector before turning in his key at the end of the collection shift. In other cases, the coin box and validator are readily accessible to the collector or technician.

Yet another cost involved in the collection process is the significant manpower required for the task of distributing, collecting, and keeping track of many thousands of keys on a daily basis.

Although electronic security systems are known and have been used for various purposes, see e.g. U.S. Pat. Nos. 4,789,859, 4,738,334, 4,697,171, 4,438,426, applicants are unaware of any which specifically address the problems, noted above.

Another problem pertaining to existing locks is that certain mechanical lock structures are not readily adapted and/or modified to include electronic capabilities. For example, existing devices are not available that can easily upgrade vending locks, etc., (such as, for example, standard N.A.M.A. vending locks) to have electronic capabilities.

BACKGROUND TECHNOLOGY OF ASSIGNEE

The present invention also improves upon existing technology of the present assignee. This technology is described herein as background to the present invention, rather than as prior art.

The disclosures of U.S. patent application Ser. No. 08/026,781, entitled ELECTRONIC SECURITY SYSTEM WITH NOVEL ELECTRONIC T-HANDLE LOCK, filed Mar. 5, 1993, now U.S. Pat. No. 6,005,487, which is a continuation-in-part of the following application, (2) Ser. No. 07/865,849, filed Apr. 9, 1992, now U.S. Pat. No. 5,745,044, which is a continuation-in-part of the following application, (3) Ser. No. 522,017 filed May 11, 1990, now U.S. Pat. No. 5,140,317, are all incorporated herein by reference herein and discussed in this section.

FIGS. 1A and 1B illustrate an electronic key 100 according to one embodiment. The key has a key body 101 which contains logic and power transfer circuitry, and a key blade 102 with appropriately cut key bits for operating pin tumblers as is known in the art. The key 100 also carries a spring loaded data and power electrical contact 103, which is made of a suitable material and is preferably gold plated.

Portable battery and logic housing 104 contains a battery power supply and electronic circuitry, a battery charging port 105, a wrist strap or belt clip 106, and a plug-connected cable 107 for transferring power and data signals between the housing 104 and the key body 101.

FIG. 1B is an end view of the key body showing the orientation of the spring loaded contact 103 with relation to the key blade 102. The key 100 and connected housing 104 with their components are portable and are referred to as "key means".

FIG. 2 illustrates a lock cylinder and bolt mechanism included in a housing 201 (with its cover removed). As shown in FIG. 2, within the housing is a bolt 202 operated by a lock cylinder 203 containing a key cylinder plug 204 having a keyway 205 for key blade 102, and an electrical contact 206 which makes contact with the power and data contact 103 of the key body when the key blade 102 is inserted into the key blade opening 205.

A bolt cam 207 is rotated by the lock cylinder 203 to move the bolt 202 between the locked position shown and an unlocked position in which the bolt is withdrawn downward to be substantially within the housing 201. The lock housing 201 further includes electronic logic circuitry 208 and an electrically powered solenoid 209. Solenoid 209 includes a spring biased bolt blocking plunger 210 which, when extended, prevents bolt 202 from being withdrawn by the bolt cam into the housing 201 to its unlocked position. Upon operation of the solenoid 209, bolt blocking plunger 210 is retracted toward the solenoid to enable the key 100 to be turned in the clockwise direction which rotates bolt cam 207 against the bolt 202 and causes the movement of the bolt 202 downward into the housing 201.

FIG. 3 illustrates a programmer for writing data into and reading data from the circuitry in key body 104 through cable 107. The programmer includes a host computer 301 which may be a minicomputer, personal computer, or any other type of computer, but which preferably is an IBM® compatible microcomputer. A key programmer interface unit 302 is connected to the computer 301 by means of a cable 303 which plugs into a communication port of the computer 301. The programmer interface unit 302 contains a key receptacle 304 having electrical contacts into which the plug end of the key cable 107 is inserted after being disconnected from key body 101 to allow the computer to write into the memory within key housing 104. The computer 301 is loaded with a software program 305 for loading and retrieving files from the key logic housing 104.

FIG. 4 illustrates a portable programmer interface unit 401 including a modem which enables the portable programmer interface unit 401 to communicate with the computer 301 through the public switched telephone network (PSTN) via a standard phone jack 402. In this embodiment, an operator in the field needing to update the contents of files in the key housing 104 would dial up the host computer using a standard phone set 403 which is connectable via a jack to the programmer interface 401. Once communication with the host computer 301 is established, the programmer interface unit 401 operates in the same manner as the office programmer interface unit 302.

FIG. 5 is a schematic block diagram illustrating the components within the electronic key housing 104. The components include a microcontroller or microprocessor 501, an electrically erasable programmable read only memory (EEPROM) 502 coupled to the controller 501, an oscillator or clock 503 which provides clock signals for the operation of controller 501, and a battery power source 504 which operates the controller 501 as well as the solenoid 209 and the circuitry 208 within the lock mechanism housing 201. The electronic key components further include an electronic switch 505 operated by the controller 501 and a power sensing circuit 506.

FIG. 6 is a schematic block diagram of the electronic circuitry 208 within the lock housing 201. This circuitry includes a microprocessor 601, an EEPROM 602 coupled to the microprocessor 601, an oscillator or clock 603 for providing operational clock signals to the microprocessor 601, a power filter 604, electronic switch 605 and load 606 for transmission of signals to the key controller 501 via line 607, and an electronic switch 608 for allowing power to flow from power source 504 within the key housing 104 through cable 107 and contacts 103–206 through the solenoid 209 to ground to activate the solenoid.

FIG. 7 is a schematic diagram of the electronic key programmer interface unit 302. It is noted that the portable key programmer interface unit 401 contains substantially the same components as the programmer 302, in addition to the modem and telephone jack not shown. The programmer interface unit 302 includes a microcontroller 701, a clock oscillator 702, an electronic switch 703 and load 704 combination which operate similarly to the switch 605 and load 606, a power supply 705, and a standard RS-232 receiver and driver 706 which couples the programmer interface unit 302 to the host computer 301.

The operation of the system components will now be described with reference to FIGS. 5–7.

The electronic key 100 is inserted into the key programmer interface unit 302 or 401 to be programmed by the host computer running the customized software application 305 via cable 107 as described above.

Using the example of a lock for pay telephones for illustration, the EEPROM 502 is loaded with data corresponding to a specific collection route. The data can be entered manually through a keyboard provided with the host computer 301, or the data can be transferred to the EEPROM 502 from files on a floppy disk inserted into a standard floppy disk drive of the computer 301.

EEPROM 502 is loaded with specially encrypted data corresponding to specific ID codes stored in each of the electronic lock memories 602 of the locks on the specific collection route. Data encryption is performed by an encryption algorithm in a known manner. EEPROM 502 also is loaded with the date of key programming, the start date as of which the key is valid, and a time window during which the key can be used, for example, 24, 48 or 72 hours from the start date. EEPROM 502 also contains an address location storing the particular key category, for example, whether the key is a collection key or service key, and a serial number for key identification. The data is encrypted using a specific algorithm performed by the software 305.

The computer 301 may also print out the particular collection route, lock key codes, time window, and start date for confirmation by the programmer.

Controller 501 keeps track of the current time and date by counting the clock inputs of oscillator 503 and using the key programming date as a reference.

The data is written into EEPROM 502 through switching of electronic switch 703 by microcontroller 701 which serves to increase and decrease the amount of power consumed by the load 704 which in turn provides the logic levels for binary "1" and "0" digital communication to the microcontroller 501. This increase and decrease in power is sensed by the power sense circuit 506 and is converted into digital signals readable by the microcontroller 501.

Referring now to FIG. 6, the lock mechanism microprocessor 601 is coupled to EEPROM memory 602 which stores a specific ID code for that specific lock. One important feature is that the lock mechanism of FIG. 2 contains no power supply itself but is completely powered by the power source 504 of the electronic key 100. Power filter 604 is provided to supply power to the logic circuits from the key 100 over line 607, the power filter smoothing the voltage waveform so that power interruptions caused by data transmission over line 607 will not affect the operation of the logic circuits.

As an additional security feature, a solenoid activation switch 609 can be mechanically coupled to the bolt blocking plunger 210 of FIG. 2 to detect the retraction of the bolt blocking plunger. In telephones equipped with a so-called "Smart Terminal" or circuit board 610, which is provided with a modem to link the telephone to the host computer over a telephone line, activation switch 609 can be used to send an alarm to the host computer when switch 609 detects the retraction of the bolt blocking plunger in the absence of generation of an enable signal by the microprocessor 601, which would be indicative of someone tampering with the lock by trying to manually pry the bolt blocking plunger away from bolt 202. An additional line 611 may be provided to establish communication between the lock microprocessor and the smart terminal 610.

The use of a smart telephone terminal 610 also allows the use of a host confirmation feature as an additional feature of the present invention. Part of the data stored in the key memory 502 is the key's particular serial number. Using the host confirmation feature, the host computer 301 would dial up the smart terminal 610 via a modem and transmit a host confirmation message to the microprocessor 601. The message may instruct the microprocessor to allow the solenoid 209 to be powered by any mechanically operable key inserted into the key slot 205, may instruct the microprocessor 601 to prevent any key at all from operating the lock by prohibiting powering of the solenoid 209, or may instruct the microprocessor 601 to allow only a key having a particular serial number, transmitted by the host computer, to operate the lock by powering the solenoid. The host confirmation data may then be stored in the memory 602 coupled to the microprocessor 601.

Referring now to FIG. 8, the overall operation of the electronic lock system will be described.

After the key blade 102 is inserted into the keyway 205 and the contact 103 is electrically coupled to the key cylinder contact 206, the electronic lock logic circuitry is powered up or awakened at step 801. At step 802, microprocessor 601 communicates with the microcontroller 501 to read the data stored in the memory 502. At step 803, microprocessor 601 checks whether the current date stored in memory 502 is after the start date written into memory 502 during the programming mode of the key, determines whether the current time read from memory 502 is within the time window stored in memory 502 which has been programmed by the host computer in advance. If the start date read from the key memory is subsequent to the current date read from the key memory, or if the current time is outside of the time window stored in the key memory, the microprocessor advances to step 809 at which the key is determined to be invalid, the microprocessor 601 is reset, and no further action is taken. If the time and date data is valid, the microprocessor 601 proceeds to step 804 in which the list of ID codes stored in key memory 502, corresponding to the locks that key 100 is to operate on this particular collection route, is compared with the current ID code stored in the memory 602. If the ID code in memory 602 is contained in the list stored in memory 502, the process proceeds to step 805 in which the presence of a host confirmation feature is checked. If not, the microprocessor proceeds to step 809. If the telephone is not equipped with a smart terminal 610, processing proceeds to step 806 in which microprocessor 601 calculates a new ID code according to a pre-stored algorithm in memory 602, encrypts the new ID code and stores it in memory 602, replacing the previous ID code stored therein. At step 807, microprocessor 601 transmits a signal to electronic switch 608 which allows power to flow from power source 504 through solenoid 209, and causes bolt blocking plunger 210 to retract in the direction toward the solenoid 209 for a predetermined period of time such as 5 seconds. At this time, the operator may turn the key body 101 and unlock the bolt. The microprocessor 601 then resets before the key body 101 is withdrawn from the insert slot 205. After the bolt is re-locked, the bolt blocking plunger 210 moves back to its blocking position shown in FIG. 2 by spring bias action.

If the coin telephone is one equipped with a smart terminal, processing proceeds from step 805 to step 808. In this step, microprocessor 601 determines whether the key serial number matches the serial number transmitted from the host computer, or whether the host computer has sent a message to prevent all keys from operating. If the key data matches the data stored in the memory 602, processing proceeds to step 806 as described above. If the key data does not match, or microprocessor 601 has received a prohibit message, processing proceeds to step 809.

As an additional feature, each lock may write its serial number and current time into a specific location of the memory 502 of the key in the event that all key data is valid to indicate that the specific lock was operated at the particular time stored with the serial number. Upon return of the key to the central office, the key may be re-inserted into the programmer interface unit 302 and the files in memory 502 read by the host computer in order to maintain a list of the locks that were operated as well as those that were not operated. All of the algorithms utilized by each of the lock microprocessors 601 are stored in the host computer 301 such that after the key is returned at the end of a collection cycle, the key may be reprogrammed with the new ID codes currently being stored in each of the operated locks, while the ID codes for the locks that have not been operated are left unchanged within the key memory 502.

Description will now be made of a second construction with reference to FIGS. 9–12. FIG. 9 illustrates a programmer 301*a*, which may be similar to the microcomputer programmer 301 of FIG. 3. The programmer 301*a* includes a CPU 901, a pair of look-up tables 902 and 903, and a daykey encrypter 904. Look-up table 902 contains a listing of various IDNs (identification numbers) and IDKs (encryption key codes) for each lock of the system. Every lock is identified by a lock identification number or IDN, and has associated therewith a corresponding encryption key code IDK which is used by the lock to encrypt data.

Look-up table 903 contains a listing of various IDNs and IDKs for each key unit 104*a* of the system. Each key unit 104*a* is also identified by a key IDN and has associated therewith a corresponding encryption key code IDK which is used by the key unit to encrypt data.

Daykey encrypter 904 contains an arbitrary encryption key code which is changed daily in the programmer 301*a* (thus the designation “daykey”).

Key unit 104*a* includes a key module 906, a handheld computer 908, and optionally a modem 910. The module 906 interfaces the handheld computer 908 to the key device 101. Handheld computer 908 is a commercially available device such as a Panasonic Model JT-770, and may be implemented by any other equivalent apparatus. The computer 908 includes a key memory 502 which stores route stop information programmed from the programmer 301*a*. The route stop information is organized into a route table containing specific routes labeled by date. The key interface module 906 includes the IDN and IDK for the key unit 104*a*.

In operation, route stops for each collector are compiled by the programmer 301*a*. These route stops may be selected by a management operator, or may be downloaded into the programmer 301*a* from a central host management system. For each key unit 104*a*, which is identified by a particular key module IDN and corresponding encryption key code IDK, the programmer 301*a* compiles a set of locks which are to be serviced for collection (or other operations) by reading out a number of IDNs and associated IDKs of the locks to be accessed by the particular key unit 104*a*, from the look-up table 902, to thereby generate a route table for transmission to the key unit 104*a*.

The IDNs and IDKs of the various locks are encrypted by the encrypter 904 using the particular daykey encryption key code in use on that day. The daykey encryption key code is then itself encrypted using the IDK encryption key code of the specific key unit 104*a* for which the route table is being compiled. The encrypted daykey, denoted as DAYKEY (IDK), is then also transmitted to the computer 908 of key unit 104*a*.

In the key unit 104*a*, the IDN identification number and IDK encryption key code are stored in the key interface module 906, while the encrypted daykey DAYKEY (IDK) and the encrypted route tables are stored in the key memory 502 of handheld computer 908.

Referring now to FIG. 11, the lock memory 602 according to the second construction contains the IDN or lock identification number of that particular lock, the IDK encryption code associated with that particular lock, and an arbitrary seed number. The seed number is simply a certain numerical value, the actual value of which is not relevant.

In order for the encrypted IDNs and IDKs of the route tables stored in memory 502 to be decrypted, the handheld computer 908 sends the encrypted daykey to the key interface module 906, which decrypts the DAYKEY (IDK) using its encryption key code IDK to obtain the decrypted daykey. The encrypted IDNs and IDKs are then sent to the module 906 to be decrypted using the daykey, and used by the module 906 in the verification process with the lock.

This feature is intended as an additional security measure to achieve an even higher level of security, for the reason that the module 906 is an add-on feature to the computer 908 and is removable therefrom. Thus, in the event that the module is lost or stolen, neither the module nor the handheld computer can be used for access to any information with respect to lock ID codes or encryption key codes. Further, since the daykey encryption code is periodically changed in the programmer, the particular daykey stored in the module 906 is of limited use.

Operation of the second construction will now be described with reference to the flow chart diagrams of FIGS. 10, 10A, and 12.

Upon insertion of the key 101 into the keyway of the lock at step 1001, power is applied to the lock at step 1201. At step 1202, the lock sends a handshake protocol to the key, which receives the handshake at step 1002 and sends an acknowledge to the lock at step 1003. At step 1203, the lock recognizes the acknowledge and sends its IDN to the key at step 1204. The key receives the lock IDN and acknowledges at steps 1004 and 1005, and checks to see whether the lock's IDN exists in memory for the presently valid route table at step 1006. As previously mentioned, the route tables are labeled by date, and the computer 908 includes a clock for keeping track of the current date.

At step 1007, if the IDN is found, the key checks to see if the lock's corresponding IDK is found in memory for the particular IDN sent by the lock and acknowledges the lock if both IDN and IDK have been found, at step 1008. Upon receiving the acknowledge at step 1205, the lock sends the seed number from memory 602 to the key at step 1206. The key acknowledges receipt of the seed number at step 1010, and the lock then encrypts the seed number with its IDK at step 1208 upon receiving the acknowledge at step 1207.

The key also encrypts the seed number from the lock at step 1011, using the IDK found for the IDN received from the lock. At step 1012, the key sends the encrypted seed number to the lock, which receives it at step 1209. The lock then compares the encrypted seed number received from the key with the encrypted seed number which the lock itself generated, at step 1210. If the numbers match, the key is determined to be authorized to access the lock. At step 1211, the key writes the encrypted seed number into the memory 602 over the old seed number. The encrypted seed number will be used as the new seed number for the next access request from a key. At step 1212, the lock sends an acknowledge to the key to inform it of a successful access request, and activates the solenoid at step 1213. The lock then resets at step 1214. If any of the acknowledges from the key are not received within a predetermined amount of time, the lock routine also advances immediately to step 1214 for reset.

Upon receiving the acknowledge from the lock at step 1013, the key unit writes the date of access into the route table at step 1014, over the IDK previously stored there. As such, the key unit will thereafter not be able to access the lock without being reprogrammed by the programmer 301*a*. Such can be accomplished either by bringing the key unit 104*a* back to the management center, or by calling into the programmer via modem 910 for reprogramming in the field.

The key unit then proceeds to step 1015 where it is reset for the next lock access attempt.

In an alternative mode of operation, the key unit may be programmed to have a set number of accesses to each lock before requiring reprogramming. Such is shown in FIG. 10A, wherein a counter is incremented at step 1014*a*, and the value stored in the counter is compared with a preset maximum number of accesses at step 1014*b*. If this number has been reached, the lock IDK is replaced by the date of access and the key unit is reset at steps 1014*c* and 1015; otherwise the key unit is immediately reset at step 1014*d*. In either event, additional access to the lock may be denied upon an attempted access to another lock.

FIG. 13 illustrates an electronic security system according to a construction relating to T-handle lock type vending machines such as snack and beverage machines, newspaper machines, gaming devices such as slot machines, stand alone lottery machines, money loaders for ATMs (automated teller machines), and transit system farecard machines.

In this construction, a portable, conventional handheld computer (HHC) 1301 is provided with an internal circuit board or option card 1310, having a CPU, memory and associated firmware or software. The option card is installed either as a built-in daughter board or may be inserted into an existing option slot in the HHC 1301, and communicates with the CPU 1325 of the HHC through an interface bus 1320. The option card 1310 of FIG. 13 replaces the add-on module 906 of the embodiment of FIG. 9 and generally performs the same functions as the module 906. As such, further description of the operation of the option card 1310 will be omitted to eliminate repetition. The HHC 1301 is connectable to a host management system 1304 through an interface 1305. An electronic key device 1302 is connected to the HHC 1301 through an input/output (I/O) port 1330 of the HHC. The option card 1310 communicates with electronic T-lock device 1340 of vending machine 1303 through the I/O port 1330 of the HHC, to transfer decrypted ID code data therebetween and thus provide access to the vending machine. Key device 1302 is similar to key device 101 of FIG. 1A.

The HHC 1301 is used to access vending machine 1303. The vending machine includes a novel electronic T-lock device 1340 (to be described in detail below). The electronic T-lock device 1340 communicates with the HHC 1301 via the key device 1302, which supplies power to the T-lock device as in the first and second embodiments. Electronic T-lock device 1340 also communicates with electronic coin vending circuitry 1350 through optocoupler interface 1360. The electronic coin vending circuitry 1350 includes a memory for maintaining information regarding the amount of money deposited in the vending machine, inventory information relating to the different types and quantities of merchandise sold and still on hand, and other pertinent information relating to the operation of the vending machine. The electronic coin vending circuitry 1350 is conventionally known in the art and for this reason will not be further described. The optocoupler interface consists of LED and optotransistor circuitry and is also well known in the art. The optocoupler interface 1360 enables existing vending machines to be retrofitted with novel electronic T-lock devices 1340 by providing isolation coupling between the existing coin vending circuitry and the T-lock device, to avoid any possible damage due to voltage incompatibility between the components. The optocoupler interface 1360 allows inventory data to be transferred from the vending machine circuitry 1350 to the handheld computer 1301 where it is stored in memory. While optocoupling circuitry is used in the preferred embodiment, it is noted that other types of interfacing including hardwiring may be used in the invention with equivalent function.

One advantage lies in the ability of the HHC 1301 to download inventory data from the vending machine 1303 by simply inserting the key device 1302 into the T-lock device 1340. Upon successful transfer of coded security information, the T-lock will retrieve inventory data from the vending circuity 1350 and transfer it to the HHC 1301. Service personnel may then read the inventory information from the HHC display, allowing the servicer to determine the quantities and types of inventory that require restocking in the vending machine, without requiring the servicer to open the machine to either access the coin vending circuitry, or to visually inspect the inventory, thus saving considerable time and enhancing convenience. The inventory data may also be uploaded to the host management system 1304 along with the route collection data as described previously, for use by management. The access protocols between the HHC 1301 and the T-lock device 1340 are the same as shown in FIGS. 10 and 12.

FIG. 14 illustrates a mechanical T-lock assembly which is used in conjunction with the modified electronic T-lock device discussed below. The mechanical aspects of the T-lock assembly are disclosed in U.S. Pat. No. 5,038,588, assigned to the assignee of the present invention and incorporated herein by reference.

In general, a locking mechanism 30 having a bolt 18 is mounted within a cylinder/extension rod housing 22. A threaded extension rod 20 is mounted in the housing at the other end thereof and is secured within the housing by means of a head 48 and teeth 58 which mate with corresponding cam means in the end of the housing 22. The lock assembly of FIG. 14 is shown in its unlocked position in which bolt 18 is retracted from engagement with an opening 44 a hollow shank portion 46 in T-handle housing unit 16. Bolt 18 is engageable with opening 44 through an aperture 42 in the cylinder/extension rod housing 22. Upon retraction of the bolt 18 from the opening 44, spring 60 forces the end of the housing 22 into engagement with the teeth 58. Front handle 15 thus pops out of its nested position within housing 16 and allows the extension rod 20 to be unscrewed from its complementary threaded section within the vending machine. The T-lock device 1340 is mounted within a door or access panel of the machine or box with which it is associated, and thus unscrewing of the extension rod 20 allows the interior of the vending machine or other type of box to be accessed. Key device 1302 is inserted into a keyway of locking mechanism 30 and is turned in order to retract bolt 18 from engagement with opening 44.

FIG. 16 illustrates the constituent parts of the modified electronic T-lock device and the locking mechanism 30. Bolt 18 is mounted in bolt housing 1640. The bolt 18 may be a spring-loaded bolt or a deadbolt. Bolt 18 includes a channel 181 and a cam slot 182 as shown in FIGS. 17E and 17F. Bolt cam 1630 is mounted within bolt housing 1640, and includes a cam pin 1631 which engages within the channel 181 and rests within slot 182 as the bolt 18 is being retracted through rotation of the key. FIGS. 17C and 17D respectively show a front and rear view of the bolt cam 1630. As shown, bolt cam 1630 includes a teardrop slot 1632, and a 180° slot 1633.

The bolt cam 1630 is engaged by shaft 1622 of armature 1623. Shaft 1622 has a projection 1625 at the end thereof adjacent the bolt cam 1630. The shaft 1622 and projection 1625 fit into the teardrop slot of the bolt cam 1630. The armature 1623 is mounted within solenoid 1620, and is normally biased toward the bolt cam by a spring 1624. Spring 1624 forces the shaft 1622 fully within the bolt cam so that the projection 1625 is located within 180° slot 1633. The other end of the shaft 1622 is slotted along the edge thereof; this slot engages with chamfer 1615 of plug assembly 1610, as shown in FIG. 17B. Plug assembly 1610 has a keyway 1613 and a data contact terminal 1614 at the front end thereof, as shown in FIG. 17A. A 180° channel 1612 is provided on the back end of plug assembly 1610. This channel interacts with a roll pin 59 which projects into the interior of housing 22 when the plug assembly is mounted therein. An alignment slot 1501 is provided in opening 1510 of front handle 15, as shown in FIG. 15, to ensure that the plug assembly, and thus projection 1625, is properly aligned with the teardrop slot 1632, by requiring the keyway 1613 to be aligned with the alignment slot 1501 in order for the key device 1302 to be inserted into the keyway. Tabs on the end of housing 22 engage with a vertical slot in front handle 15, and the housing 22 is rigidly secured to the front handle by means of a set screw 1503 which is threaded through thread hole 1504 in handle 15. The electronic lock circuit as shown in FIG. 16 is formed on an IC chip 1502 which is mounted within a hollowed out section of front handle 15. Wire contacts 1611 connect the data/power contact terminal 1614 to the IC chip 1502 and power terminals 1621 connect the solenoid 1620 to the IC chip 1502. Additional wiring (not shown) connects the IC chip to the optocoupler interface 1360.

In operation, when the solenoid 1620 is unenergized, the spring 1623 forces the projection 1625 into the 180° slot 1633 of the bolt cam. Thus, insertion of a key or other instrument in keyway 1613 will allow the plug assembly 1610 and armature 1623 to be freely rotated 180° without engaging the bolt cam to retract the bolt 18. Upon the proper transfer of decrypted ID code data from the HHC to the lock circuit 1502, the lock circuit allows power to be transmitted to the solenoid 1620, drawing the armature 1623 in toward the solenoid. In this position, the projection 1625 engages with the teardrop slot 1632, and rotation of the key 1302 will thus rotate the bolt cam 1630 causing the bolt 18 to retract and providing access to the vending machine.

While the disclosed T-lock assembly uses a threaded extension rod, this is not critical to the operation thereof, and other equivalent attachment mechanisms for securing the T-lock to the housing enclosure such as ratchets, latches, pins, etc. may be used equivalently.

SUMMARY OF THE INVENTION

The present invention provides an electronic security system which overcomes the above and other problems in the background art.

The present invention also provides an electronic security system that can sigificantly reduce collection costs and which can eliminate the requirement of costly re-keying in the event of a key loss. The present invention can also provide a very space efficient electronic lock. Among other things, this enables existing systems to be readily adapted to include electronic capabilities.

The present invention further provides an electronic security system which substantially eliminates the possibility of internal fraud and theft.

According to a first aspect of the invention, an electronic security system is provided which includes i) an electronic lock, including: a hollow cylinder; an opening into the cylinder; a bolt movable through the opening between an extended position and a retracted position; a drive member within the cylinder, the drive member contacting the bolt to move the bolt to an unlocked position; a solenoid within the hollow cylinder, the solenoid being engageable with the drive member; an electronic lock circuit within the hollow cylinder; a plug connected to the solenoid for rotating the solenoid, the plug having a keyway for insertion of key means for rotating the plug; and ii) key means insertable within the keyway and having electronic means for communicating with the electronic lock circuit to operate the lock. The terminology "key" and "keyway" refer to both the traditional meaning thereof in the art as well as to a general reference to a key "tool".

According to another aspect of the invention, the plug is fixedly connected to the solenoid such that the solenoid moves with the plug.

According to another aspect of the invention, the drive member is a cam member that includes a rotatable plate portion and a drive portion mounted thereto, the drive portion being engageable with a surface of the locking bolt upon rotation of the rotatable plate to move the locking bolt.

According to another aspect of the invention, a blocker member mounted to the rotatable plate portion, the blocker member being moved to a position beneath the locking bolt when the locking bolt is extended to operate as a dead bolt.

According to another aspect of the invention, a solenoid is provided that is adapted to transmit a torque when energized. Torque transmission is preferably accomplished through a magnetic clutch or through a mechanical interlock. In one exemplary embodiment, the torque transmitting solenoid includes a shaft that is either retracted (pulled) or extended (pushed) when the solenoid is energized, the rotatable plate portion having a bore configured to receive the shaft, such that when the key means is inserted into the keyway and the solenoid is energized, rotation of the key means results in simultaneous rotation of the rotatable plate portion and the drive member.

According to another aspect of the invention, an electronic lock device is provided which includes: i) a lock including a mechanical drive train for opening an access door; ii) an electronic device for electronically controlling access through the access door; iii) the electronic device including a solenoid situated within the mechanical drive train; iv) the solenoid having a housing that is rotated as a part of the drive train, the solenoid engaging a drive member upon energization of the solenoid, such that rotation of the solenoid when energized causes the drive member to simultaneously rotate to connect the drive train and to allow access through the access door. Preferably, the solenoid has a movable shaft member that has an engaging member which engages a corresponding engaging member of the drive member upon engergization of the solenoid. The electronic lock device can be used for an access door of, for example, a building through which an individual walks or a device having an enclosed housing into which manual access is desired.

The above and other advantages, features and aspects of the present invention will be more readily perceived from the following description of the preferred embodiments thereof taken together with the accompanying drawings and claims.

BRIEF DESCRIPTION OF THE DRAWINGS

The present invention will become more fully understood from the detailed description given hereinbelow and the accompanying drawings which are given by way of illustration only, and are not limitative of the present invention.

I.

FIGS. 1–17 illustrate background technology of the present assignee.

Figure 1A:
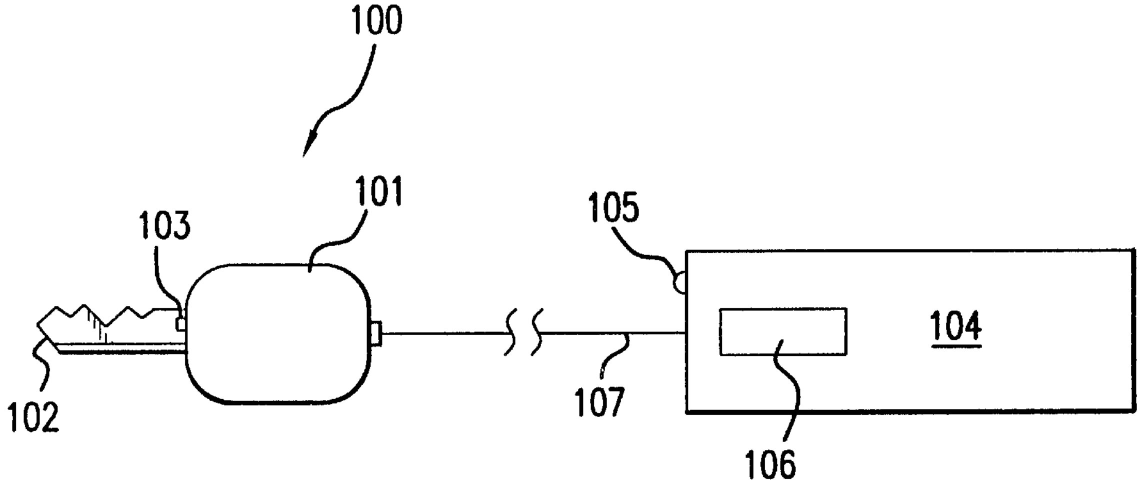
Figure 1B:
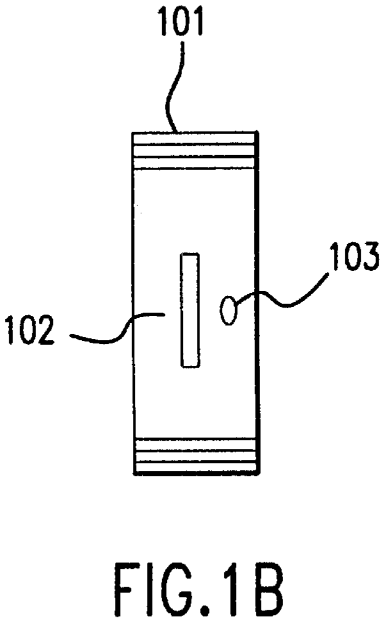
Figure 2:
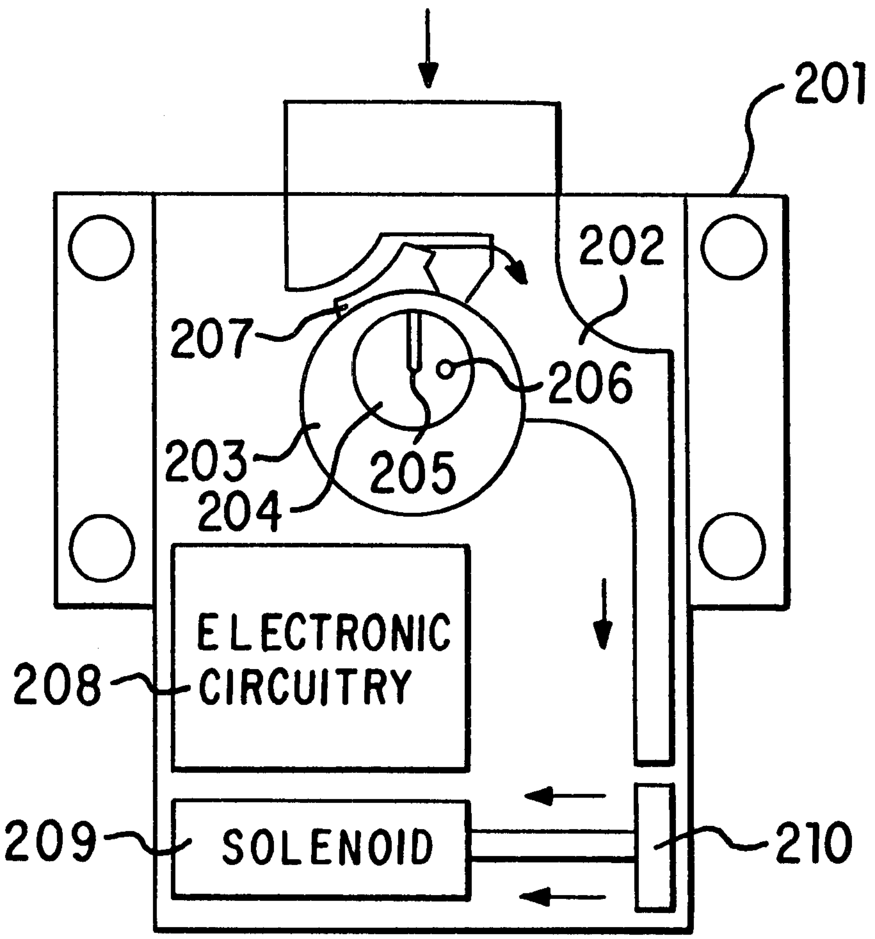
Figure 3:
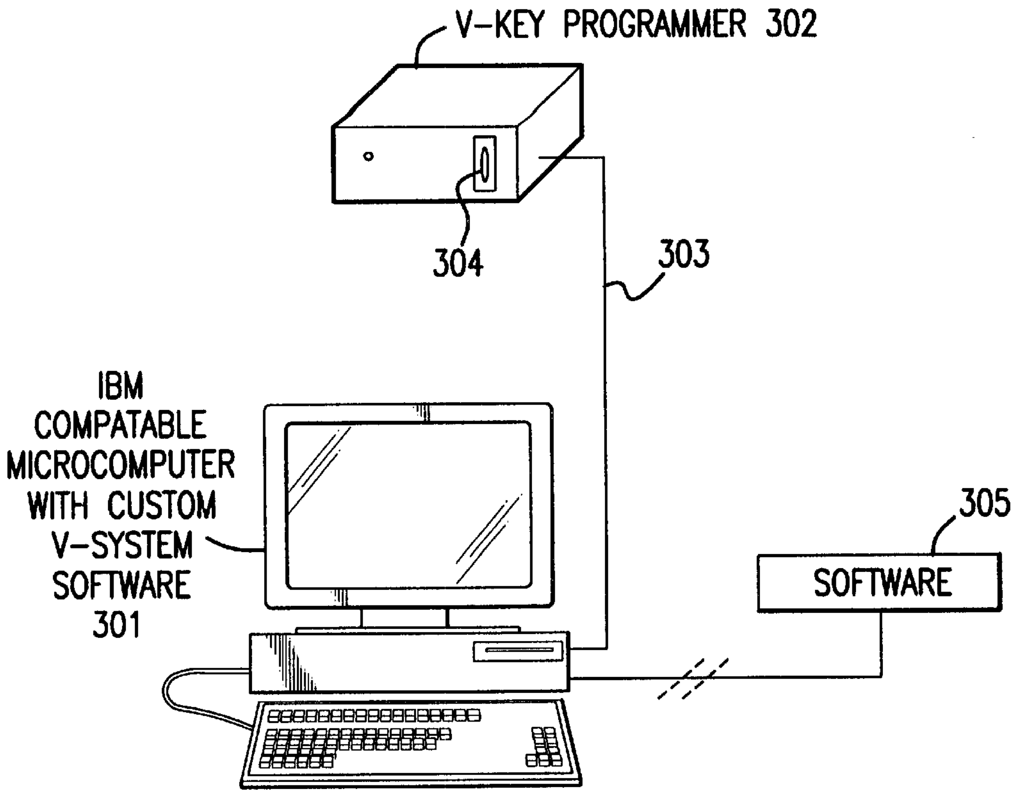
Figure 4:
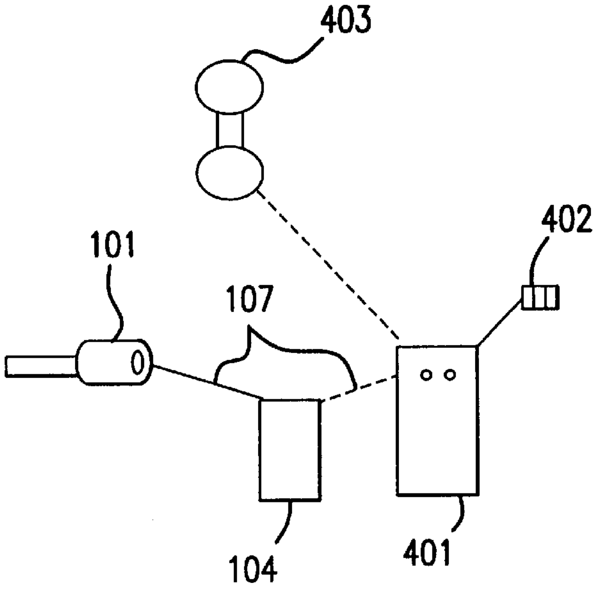
Figure 5:
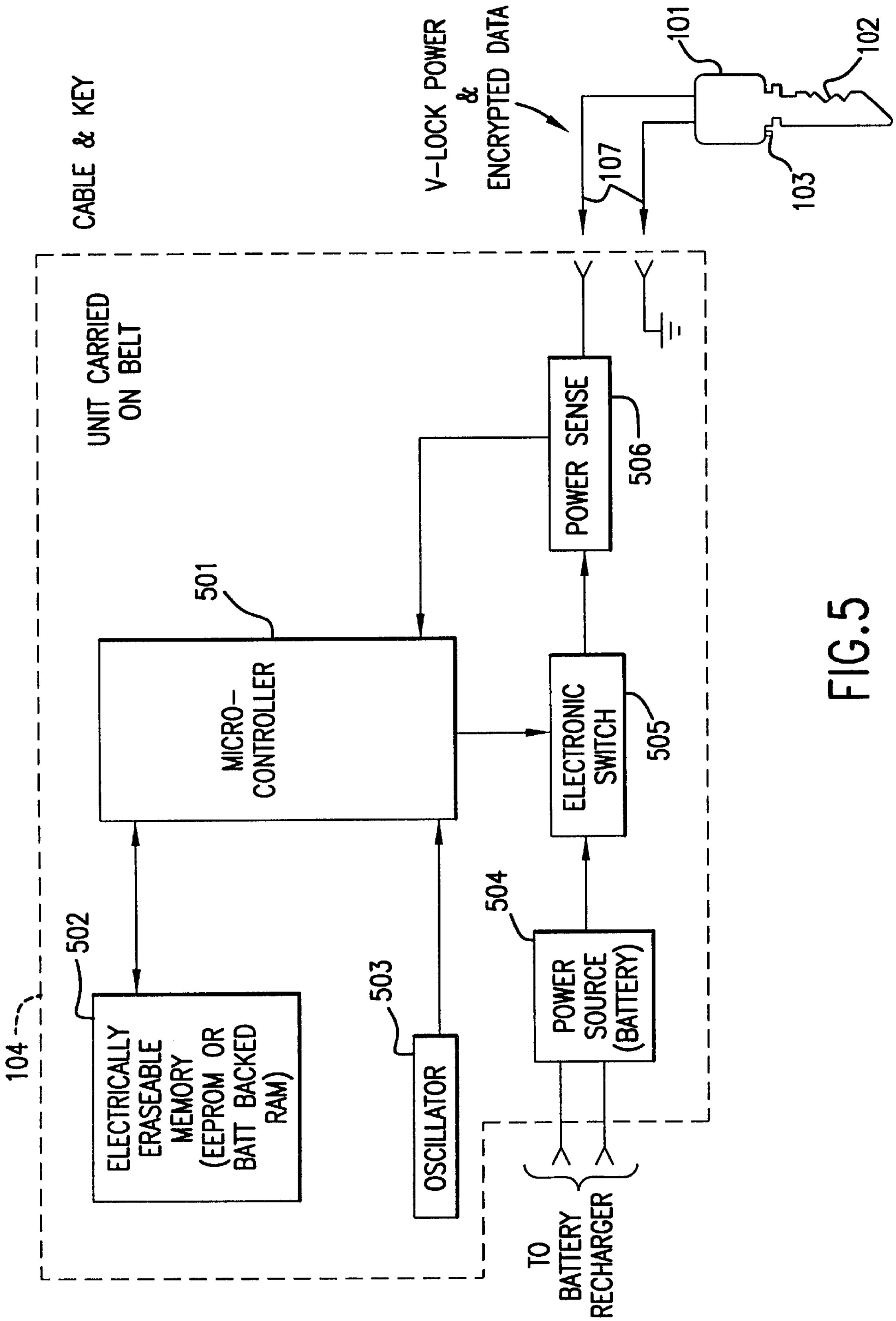
Figure 6:
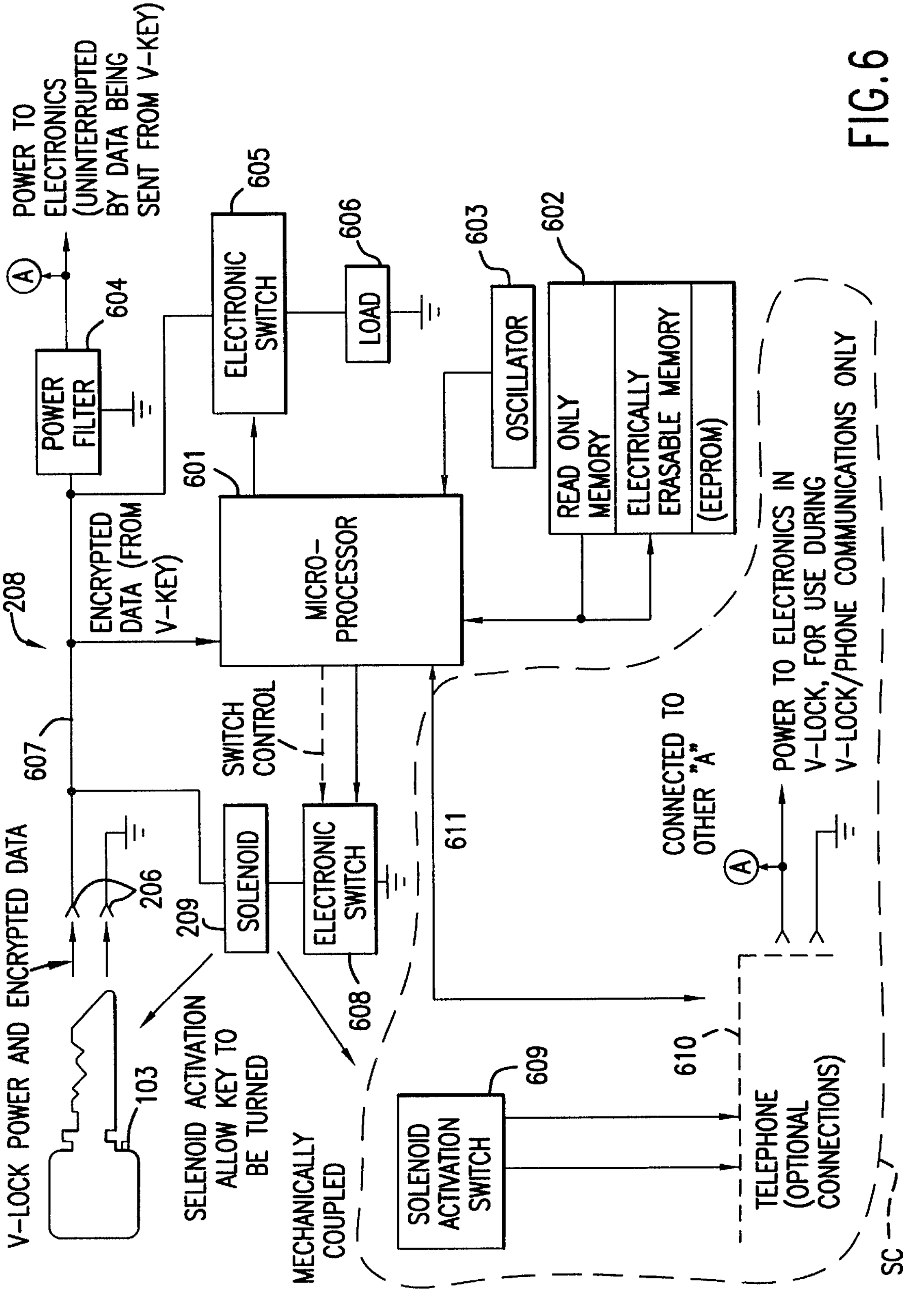
Figure 7:
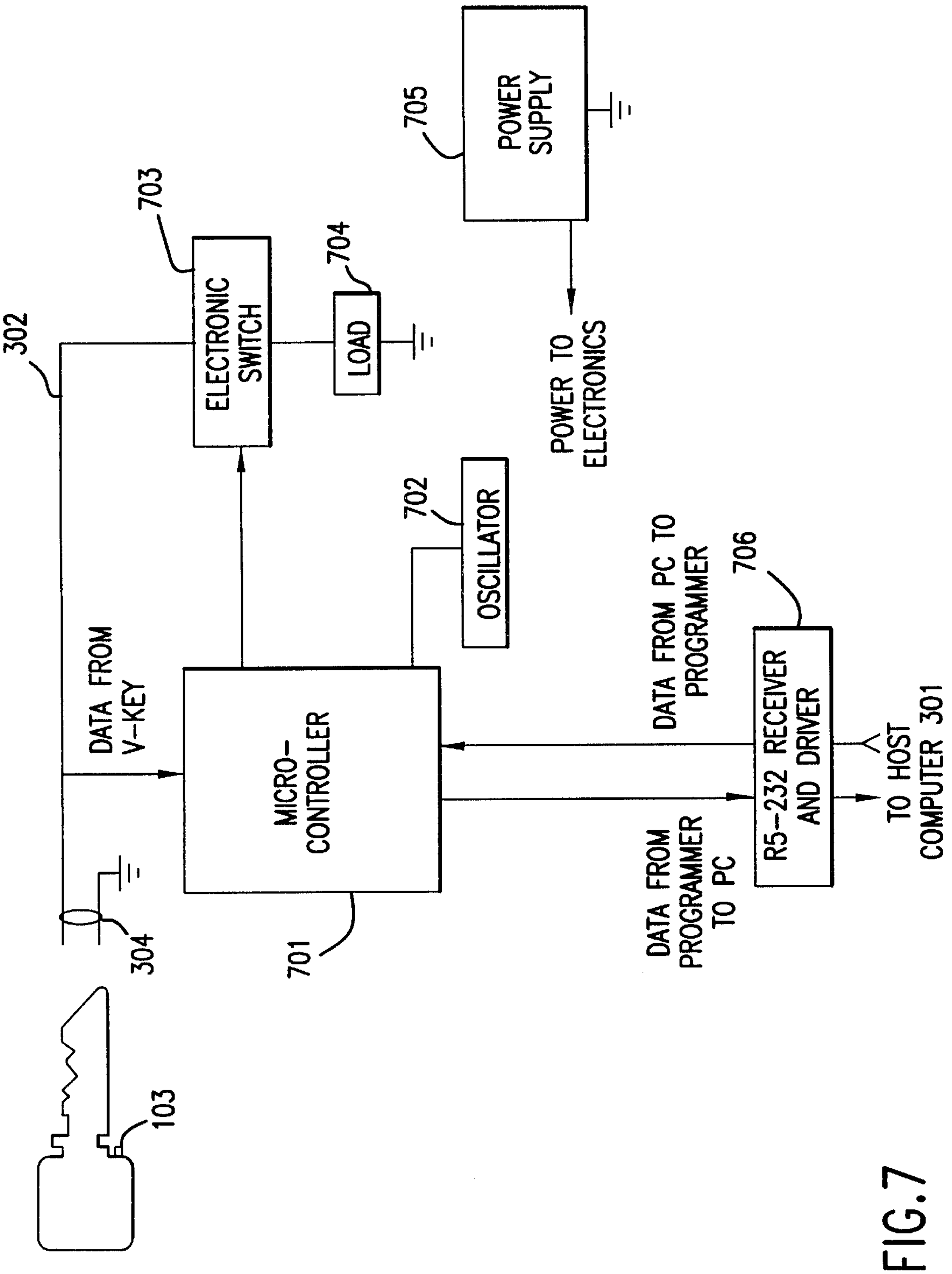
Figure 8:
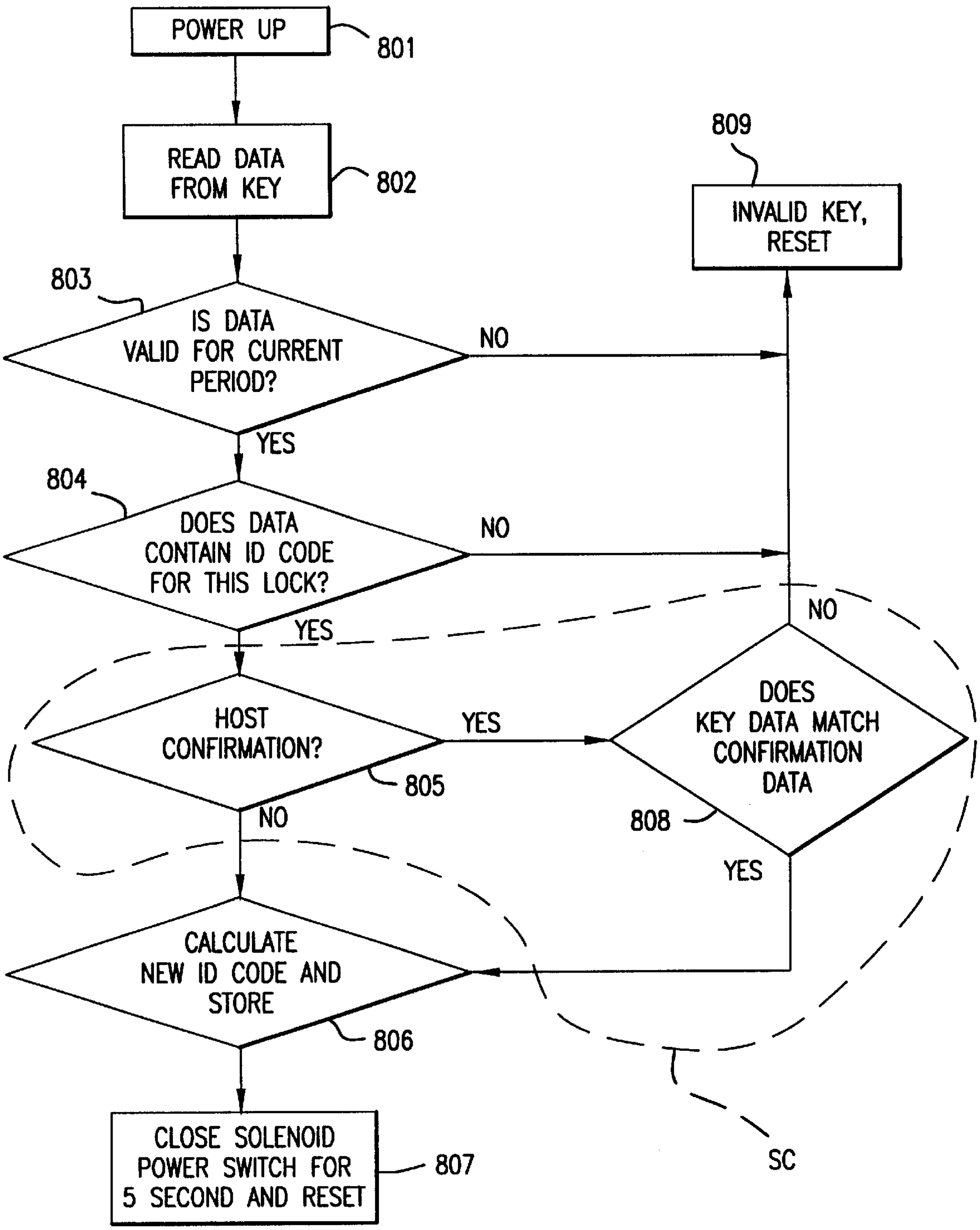
Figure 9:
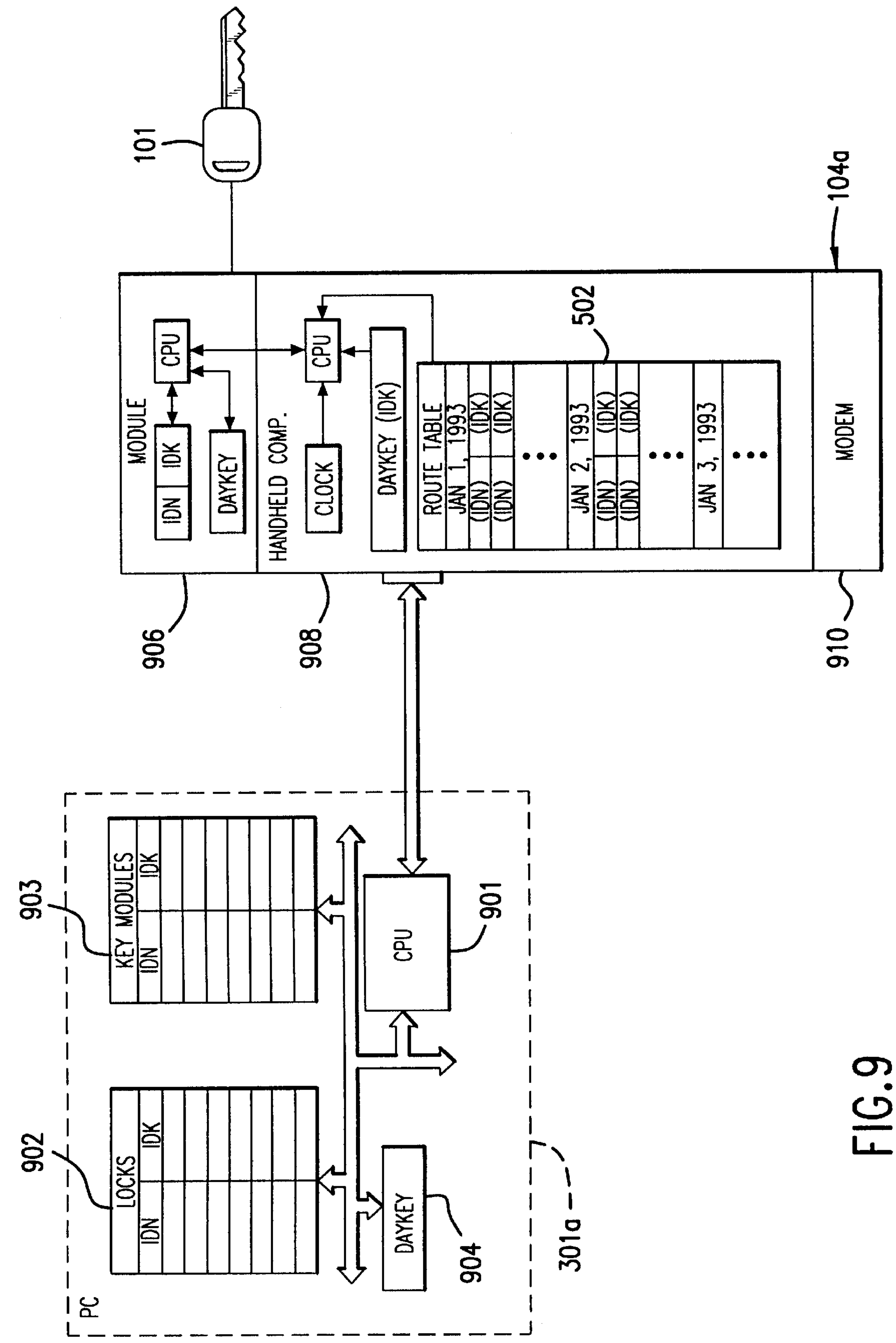
Figure 10:
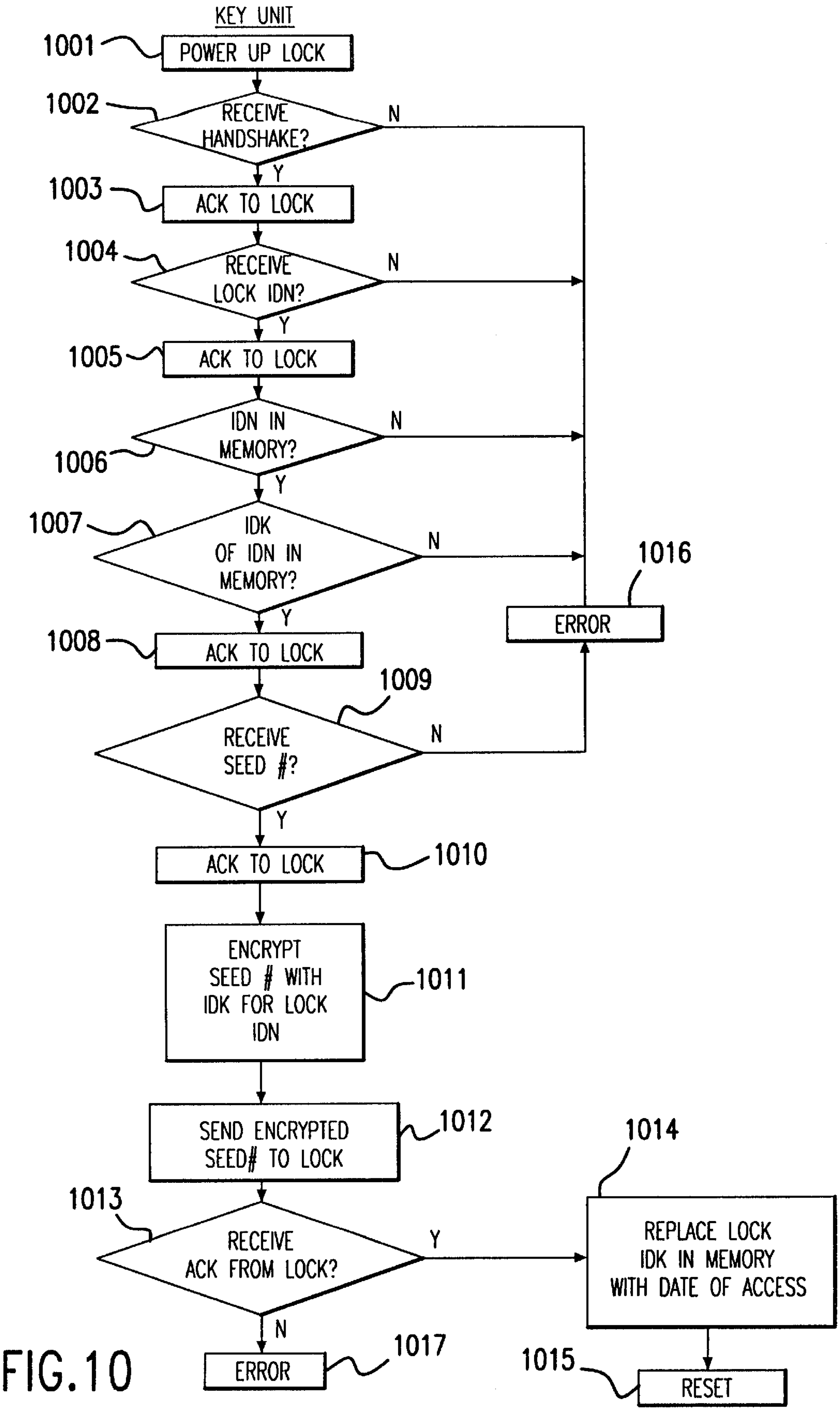
Figure 10A:
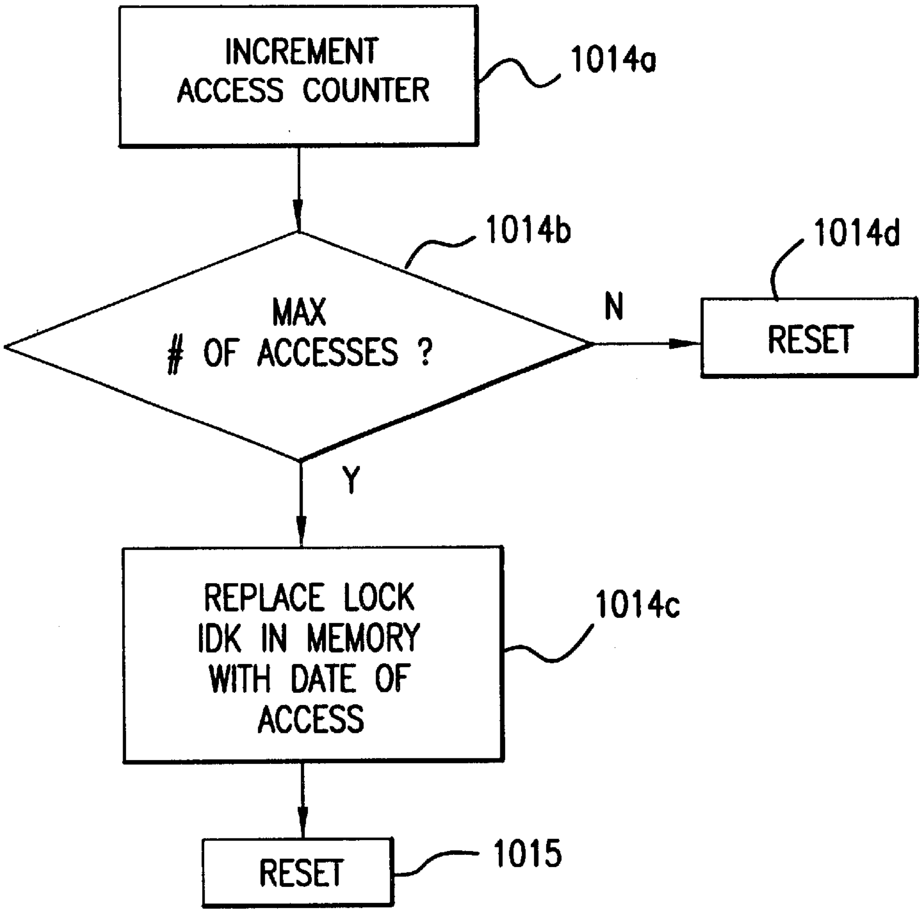
Figure 11:
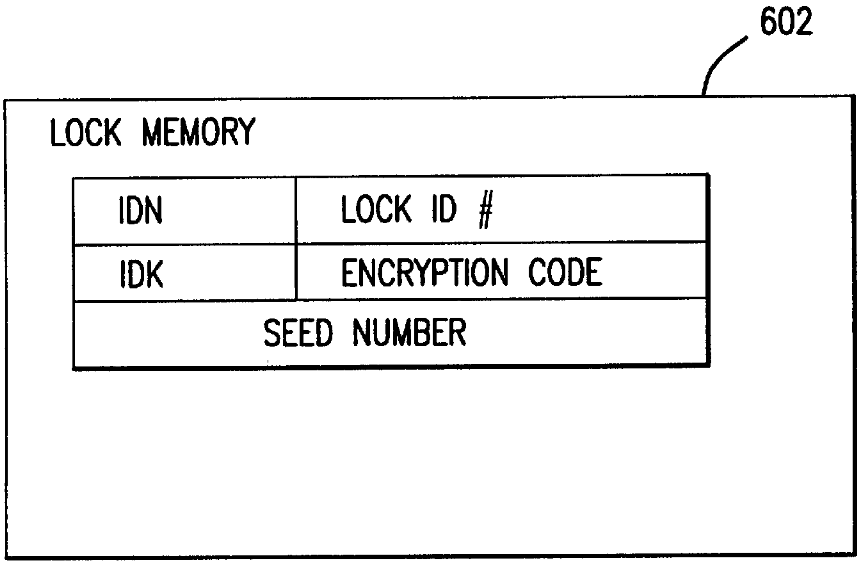
Figure 12:
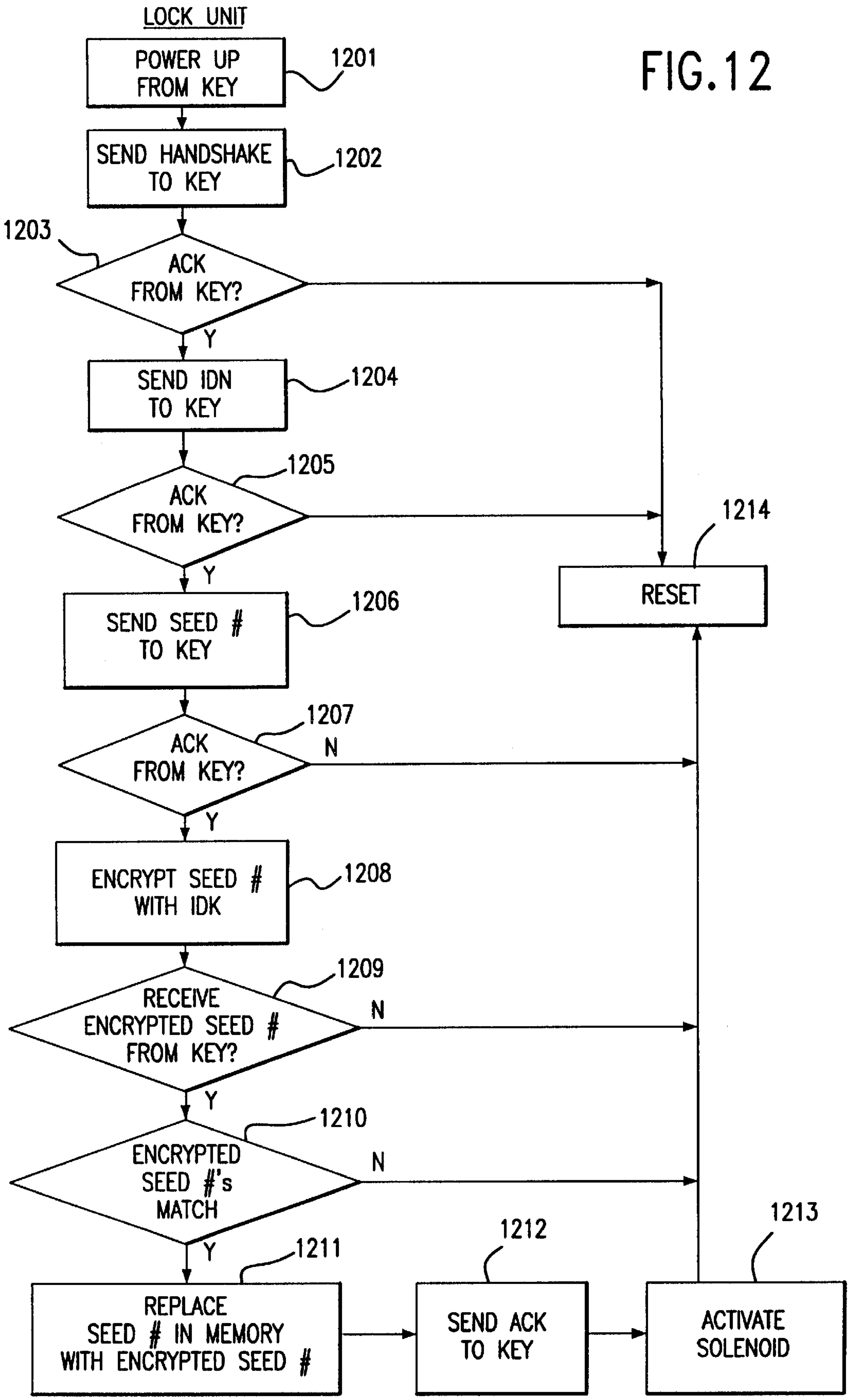
Figure 13:
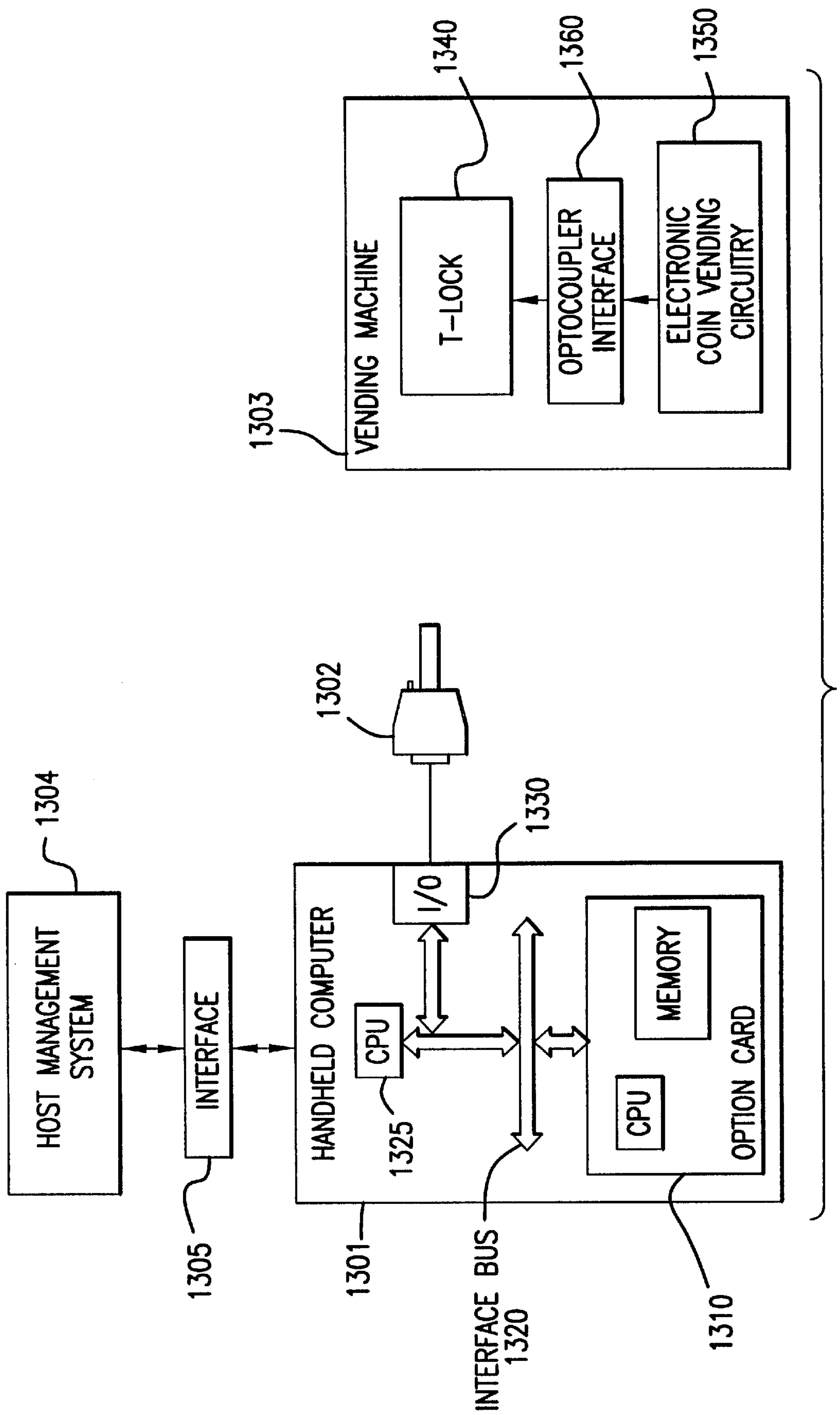
Figure 14:
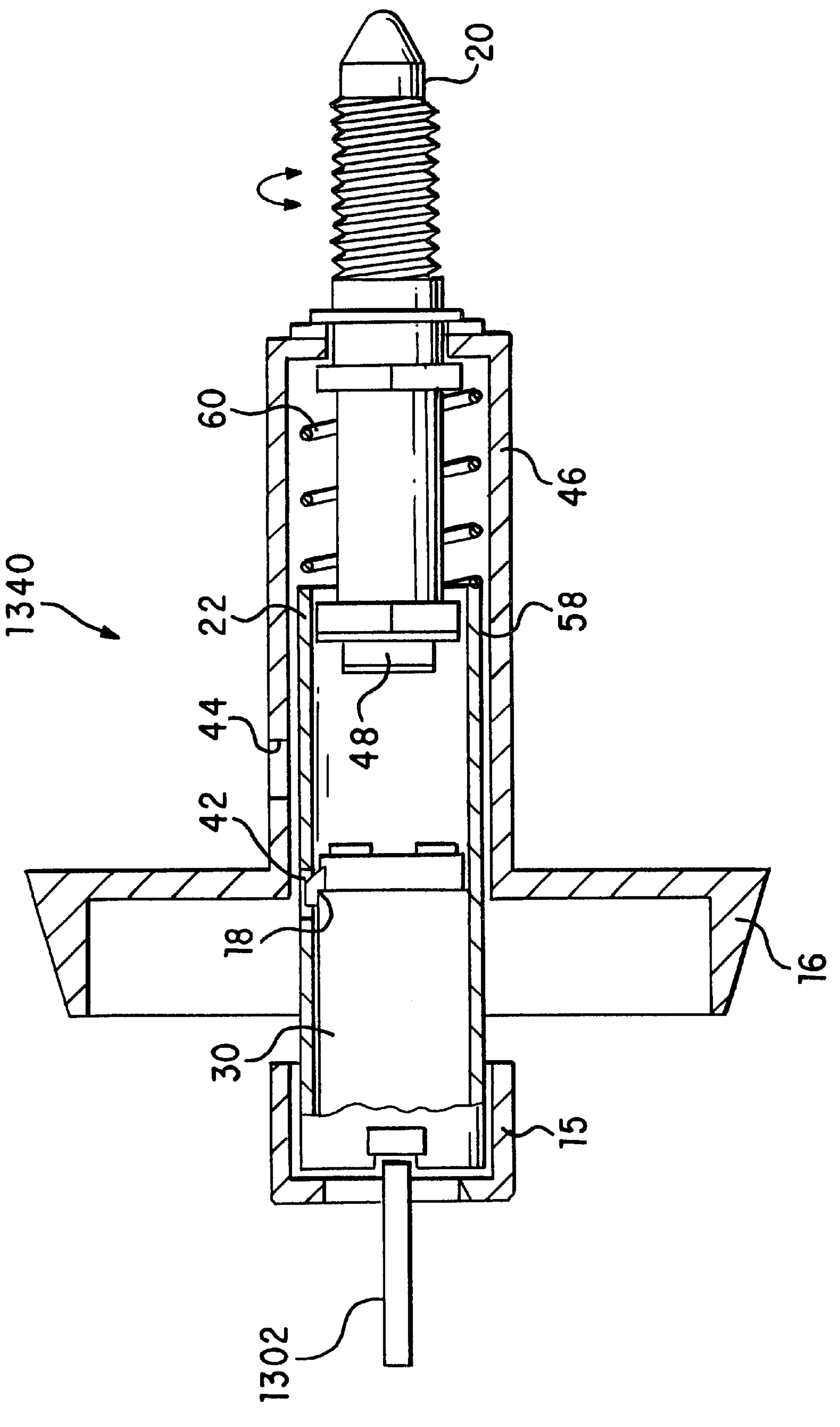
Figure 16:
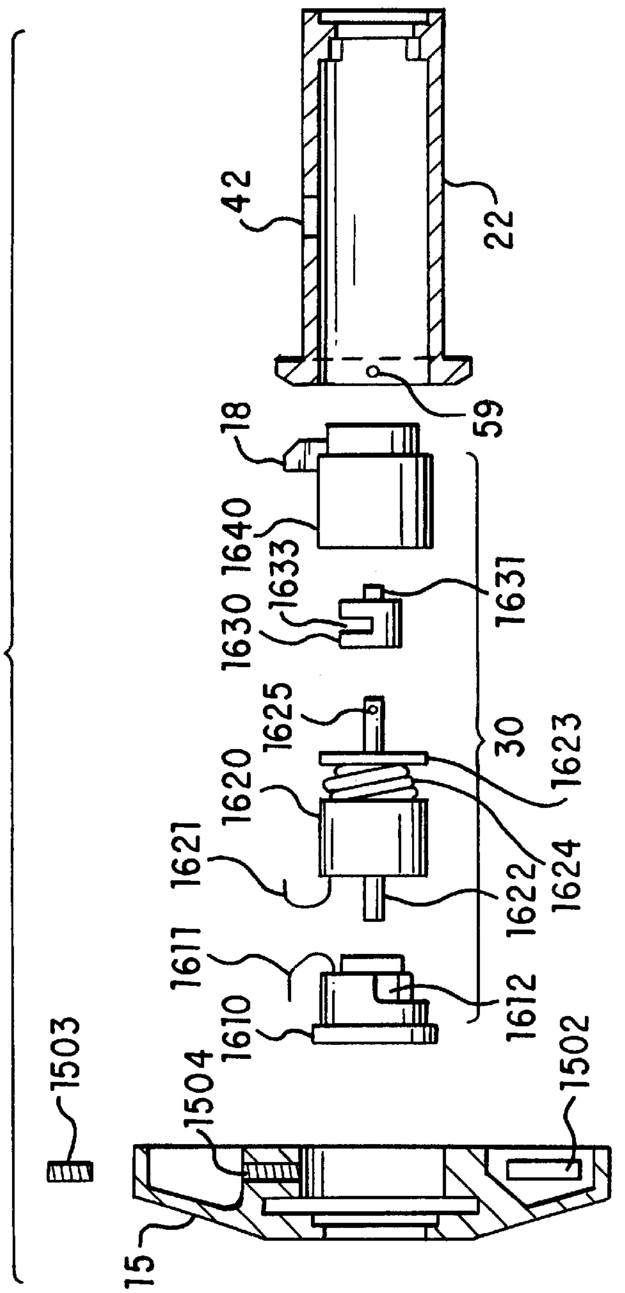
Figure 15:
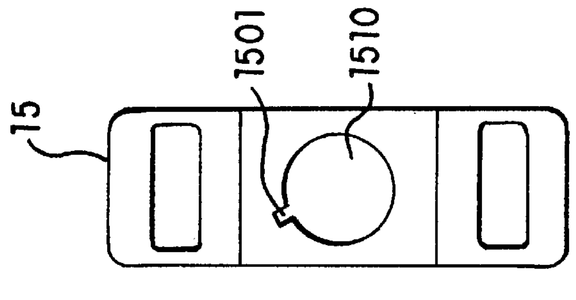
Figure 17A:
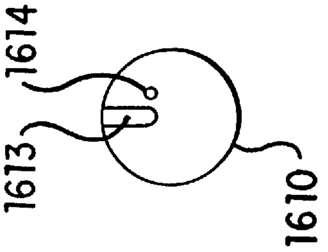
Figure 17B:
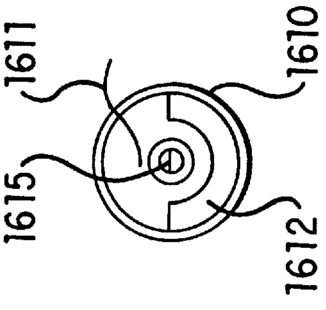
Figure 17C:
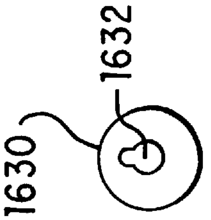
Figure 17D:
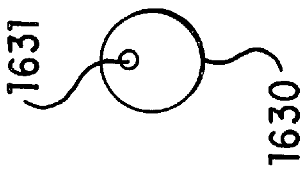
Figure 17E:
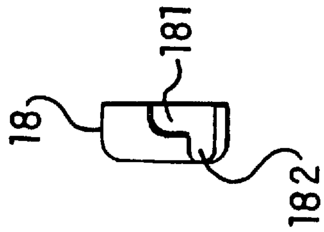

FIGS. 1A and 1B are side and end elevational views, respectively, of an electronic key with its own power supply according to one preferred embodiment;

FIG. 2 is a front elevation view of a lock cylinder and associated mechanisms (shown with the housing cover removed) for operation with the key of FIGS. 1A and 1B;

FIG. 3 is a schematic view of a first embodiment of an electronic key programmer;

FIG. 4 is a schematic view of another embodiment of a portable key programmer;

FIG. 5 is a schematic block diagram of the circuit elements of the electronic key of FIG. 1A;

FIG. 6 is a schematic block diagram of the electronic components of the lock mechanism of FIG. 2;

FIG. 7 is a schematic block diagram of the electronic key programmer of FIGS. 3 and 4;

FIG. 8 is an operational flow chart diagram of the electronic lock mechanism operation;

FIG. 9 is a schematic block diagram of an electronic key programmer and an electronic key unit according to a second embodiment;

FIG. 10 is a flow chart diagram of the operation of the key unit 104*a* of FIG. 9;

FIG. 10*a* is a flow chart diagram of an alternative routine for step 1014 of FIG. 10;

FIG. 11 is block diagram of the contents of lock memory 602 according to the second embodiment;

FIG. 12 is a flow chart diagram of the operation of the lock unit 201 according to the second embodiment;

FIG. 13 is a block diagram of an electronic security system relating to T-handle type vending machines;

FIG. 14 is a partly cross sectional side view of a T-handle lock assembly;

FIG. 15 is a front view of the cylinder front handle 15 of FIG. 14;

FIG. 16 is an exploded partly cross sectional side view of a cylinder front handle, cylinder/extension rod housing subassembly, and modified bolt release assembly;

FIG. 17A is a front view of plug assembly 1610 of FIG. 16;

FIG. 17B is a rear view of plug assembly 1610;

FIG. 17C is a front view of bolt cam 1630 of FIG. 16;

FIG. 17D is a rear view of bolt cam 1630;

FIG. 17E is a front view of bolt 18 of FIG. 16; and

Figure 17F:
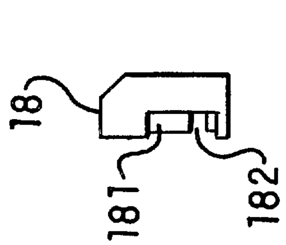

FIG. 17F is a side view of bolt 18.

II.

FIGS. 18–21 illustrate the preferred embodiments of the present invention.

Figure 18:
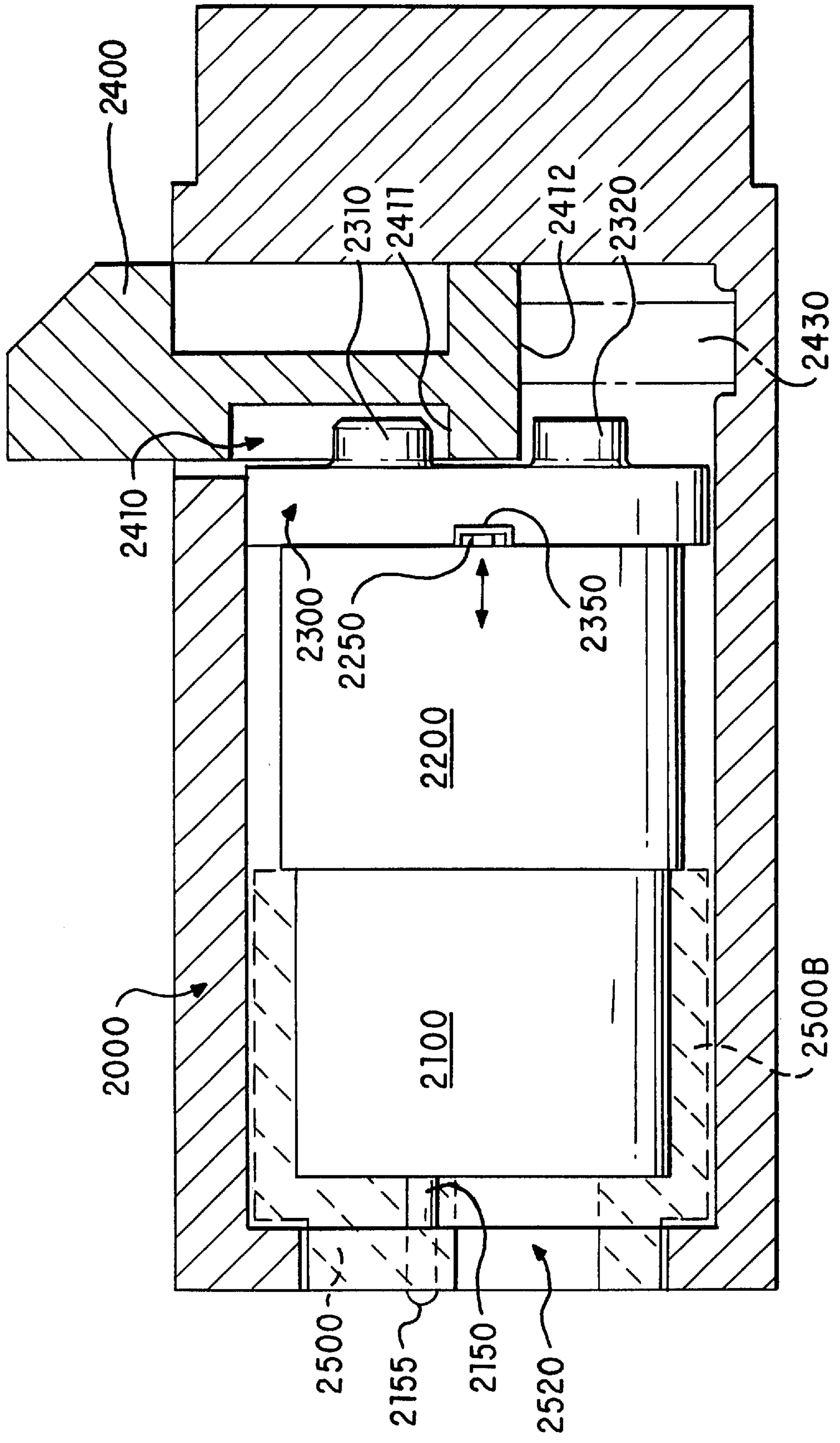
Figure 19A:
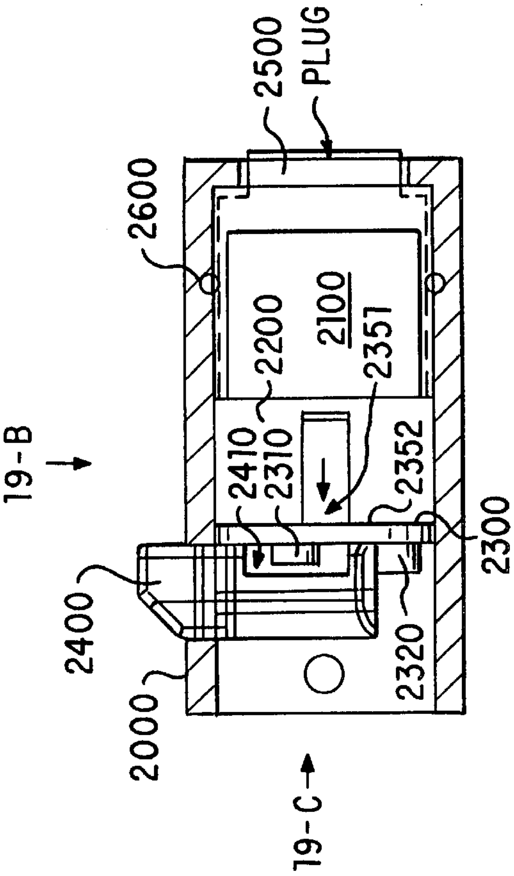
Figure 19B:
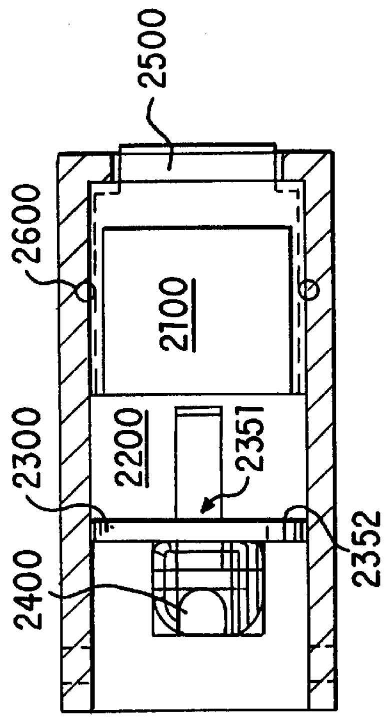
Figure 19C:
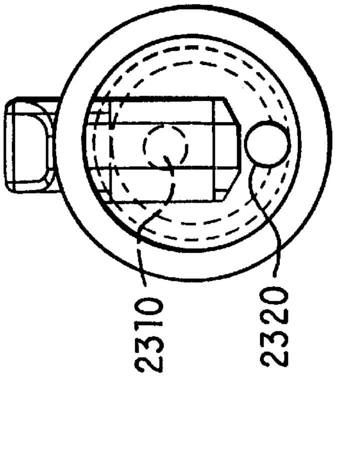
Figure 20A:
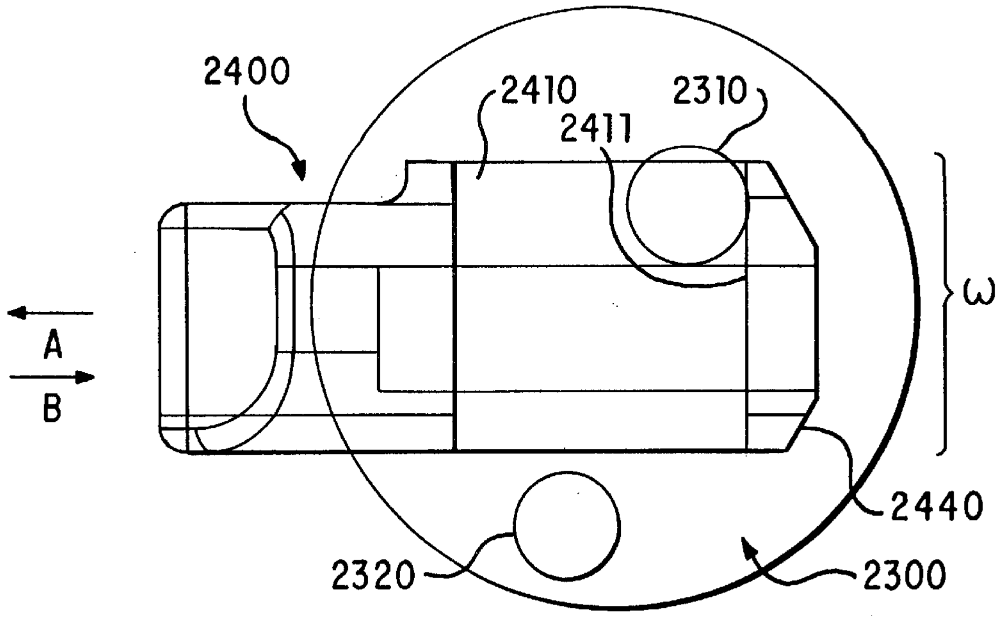
Figure 20B:
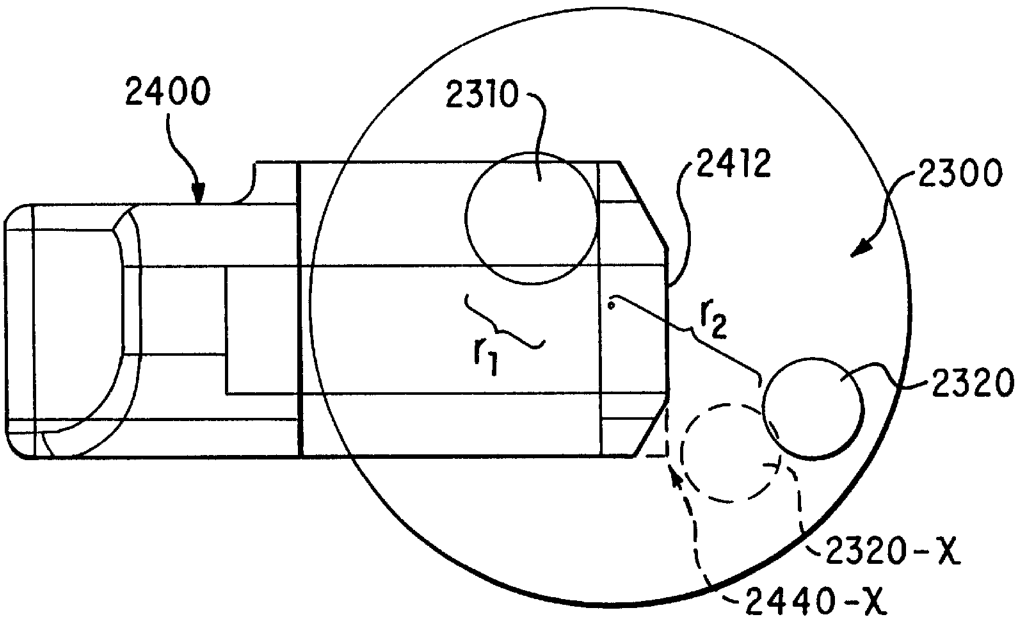

FIG. 18 is a cross-sectional side view of a preferred embodiment of the invention related to fitting of an electronic lock assembly within a lock cylinder;

FIG. 19A is a cross-sectional side of an embodiment similar to that shown in FIG. 18;

FIG. 19B is a cross-sectional view in the direction of arrows 19-B shown in FIG. 19A;

FIG. 19C is a schematic end view in the direction of arrow 190C shown in FIG. 19(A);

FIG. 20A is a conceptual view showing the bolt in a retracted state;

FIG. 20B is a conceptual view showing the bolt in an extended state; and

FIGS. 21A–21D show cross-sectional views of some alternative variations of the solenoid according to the present invention.

DETAILED DESCRIPTION OF THE PREFERRED EMBODIMENTS

The lock shown in FIGS. 18–21 preferably utilizes an electronic control like that described with reference to the background technology shown in FIGS. 1–17. In particular, a key or key means can be used similar to that described herein-above, and the circuitry can employ means like that detailed herein-above. As should be understood by those in the art based on this disclosure, the electronic control can include features described herein-above as applicable to the present invention discussed below. It is noted that the features pertaining to the "smart" capabilities—as, for example, encircled and labeled SC in FIGS. 6 and 8—are not to be included in the most preferred embodiments. In alternate embodiments, the lock illustrated in FIGS. 18–20 can utilize other known electronic controls used in other electronic security systems.

FIG. 18 illustrates an electronic security system according to a preferred embodiment of the present invention relating to locks having cylinders, such as, for example, vending machines such as, e.g., snack and beverage machines, postal machines, dollar/coin exchange machines, and transit system farecard machines. The present invention can be used, for example, to retrofit cylinders of locks and to provide electronic ability to (a) improve key control, key management, and route management, (b) control access, (c) increase accountability, (d) reduce problems associated with lost keys, and (e) reduce internal theft and fraud. As one example, the present invention can be located within the cylinder portion of a standard T-lock, such as, e.g., within a cylinder housing portion 22 shown in FIG. 14. As another example, the present invention can be used within the space dimensions of a N.A.M.A. standard vending lock. For example, a circuit assembly, a splendid device, a blocking mechanism, a bolt and an inner plug are all locatable within a standard cylinder according to the present invention. Thus, one of the benefits of the present invention is that—if desired—it can easily be minimized. The present invention can easily be located within a cylinder that is substantially less than an inch wide and substantially less than a few inches long, or even within substantially smaller cylinders, or within other small volumes.

In the preferred embodiment shown in FIG. 18, a cylinder 2000 has essential components mounted therein—e.g., a circuit 2100, a solenoid 2200, a drive member 2300 (e.g., a cam member in this embodiment), a locking bolt 2400, and a plug 2500. In the preferred embodiments, the cylinder 2000 is a standard pop-out cylinder having dimensional characteristics in accordance with N.A.M.A.

The circuit 2100, e.g., a printed circuit board, is electrically connected to an inserted key via the connector 2150. The circuit 2100 can include circuitry like that discussed above in the preceding section regarding FIGS. 1–17. Although not illustrated in FIGS. 18–20, the key means used can be the same as that of any of the above-noted embodiments. For example, a key means like that shown in FIG. 1A can be utilized.

The solenoid 2200 can be driven by way of the key means and the circuit 2100 in the same ways as discussed in the preceding section pertaining to FIGS. 1–17. In one preferred embodiment of FIG. 18, the solenoid linearly extends a shaft 2250. The shaft 2250 can be received in a corresponding bore 2350 in the cam member 2300. The cam member 2300 is preferably a rotatable plate member. The shaft 2250 and bore 2350 preferably have like shapes, such that the shaft fits within the bore and is not freely rotated therein. For example, the shaft 2250 and the bore 2350 can both be hexagonal, octagonal, square, gear toothed, etc., or any irregular shape. Preferably, the shaft and bore both have a symmetrical shape that creates a plurality of aligning keys at a number of angular positions, such as with gear teeth, etc.

As shown in FIG. 18, a plug 2500 is configured to received a key means in a manner to align an electrical contact 2155 of an electrical connector means 2150 with an electrical contact on the key or key means. The electrical contact on the key or key means can be like that discussed in the preceding section regarding FIGS. 1–17, such as the electrical contact 103 shown in FIG. 1. In this regard, the plug 2500 preferably includes a slot 2520 for receiving a key blade or the like. The key blade can, if desired, overlap the circuit 2100 to extend further into the cylinder 2000. The plug 2500 can include a portion 2500B (shown with dotted lines) that extends around the circuit 2100 and connects to the solenoid. Preferably, there is no relative movement between the solenoid, circuit and plug so that the solenoid, circuit and plug move together as an integral unit. As long as the solenoid, circuit, and plug move together, they can be connected together in a variety of ways. The solenoid, circuit and plug can also be accommodated within a unitary shell sized to fit and rotate within the cylinder 2000. In an alternative construction, the plug 2500 and solenoid 2200 could be mounted to rotate as a unit while the circuit 2100 is fixed within the cylinder 2000. For example, a circuit board 2100 could surround a portion of the plug extending to the solenoid and could include sliding contacts to provide electrical connections. Nevertheless, the illustrated embodiments are preferred.

In operation, the key means is inserted into the plug 2500 so that the contact on the key means communicates with the printed circuit board. The electrical communication between the key means and the circuit board can be like that discussed above in the preceding section regarding FIGS. 1–17. Then, the key means is rotated. Rotation of the key means results in a corresponding rotation of both the circuit board 2100 and the solenoid 2200. In the event that the electrical system approves the use of the inserted key, the solenoid 2200 (which, as noted, is preferably powered by a battery in the key means) biases the shaft 2250 from a normally unkeyed position inside the solenoid towards a keyed bore 2350 in the cam member 2300. When the solenoid 2200 is rotated to a position where the shaft 2250 and the bore 2350 align, the shaft 2250 moves by the force of the solenoid to a position that engages the bore, thereby transmitting the torque from the plug to the cam. Further rotation of the key or key means rotates the cam 2300. As a result, the locking bolt 2400 can be extended and/or retracted by appropriately rotating the key. In this embodiment, the solenoid 2200 can—if desired—be made very small. For example, in one preferred construction, the shaft 2250 moves only about 0.1 inch.

In an alternative embodiment, as shown in FIGS. 19A and 19B, the solenoid 2200 operates as a magnetic drive clutch. That is, the solenoid can operate in a manner to impart an engaging force due to the magnetic field of the solenoid, the solenoid magnetically grasping the cam (or other like drive member) upon energization. In addition to the pure magnetic force, the cam (or other like drive member) can also be caused to frictional engage the solenoid upon energization. That is, rather than extending a shaft within a bore 2350, the solenoid can energize a wide element 2351 to frictionally engage a side surface 2352 of the cam 2300. This frictional engagement can even be enhanced by roughening up the contacting surfaces or the like, if desired. In order to ensure full disengagement upon de-energization of the solenoid, one or more springs can be provided to force the cam (or like drive member) and the solenoid apart from one another upon de-energization. That is, the force of the spring would be overcome upon energization, but would facilitate separation upon denergization. With respect to the embodiments employing a movable shaft instead of a magnetic drive clutch, it is noted that these shafts are preferably normally biased to a disengaged state and moved into an engaged state upon energization. This normal bias can, for example, be effected with springs or the like. It is noted that the most preferred embodiments of the present invention include a movable shaft 2350, especially when the solenoid size is minimized.

Figure 21A:
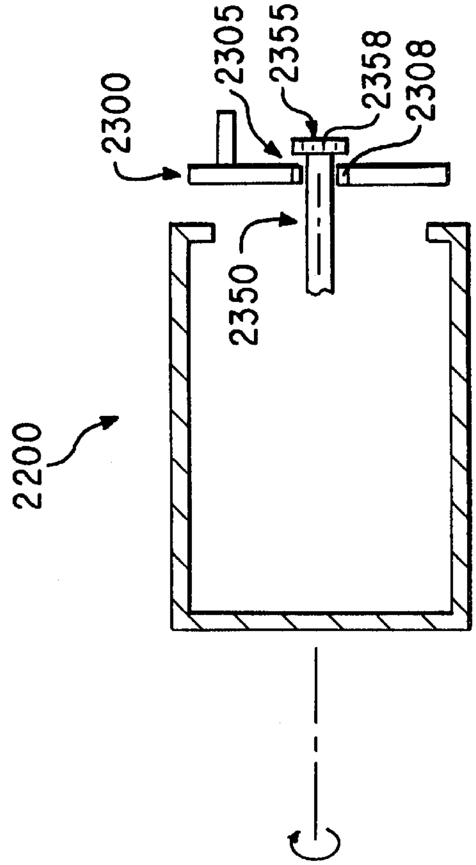
Figure 21B:
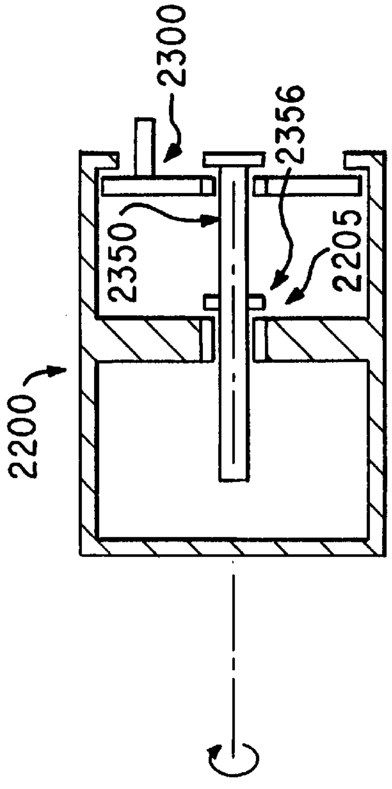

A number of variations, showing some alternative embodiments, of the solenoid 2200 are illustrated in FIGS. 21(A)–21(D). The alternative shown in FIG. 21(A) shows that the shaft 2350 can be made to retract upon energization such that an engaging member 2355 mounted to the shaft engages an engaging member 2305 of the cam 2300. The engaging member 2305 is shaped and sized to receive the engaging member 2355 so as to cause the cam 2300 to be rotated along with rotation of the shaft 2350. FIG. 21(B) illustrates that the cam 2300 can be located within the housing of the solenoid 2200. FIG. 21(B) also illustrates that the solenoid can include a keyway 2205 that is configured to receive keys 2356 attached to the shaft 2350 upon energization. The use of such keys 2356 and keyway 2205 enable the shaft to be fully disengaged from the solenoid 2200 and the cam 2300 until energization. The keys and keyway can also be used within the solenoid in the embodiment illustrated in FIG. 18 or in any other embodiment, such as in the embodiment shown in FIG. 21(C) discussed below. Alternatively, in any of the disclosed embodiments, the keys and keyway can be configured to remain in engagement at all times (as one example, the keys can be constructed to extend along the entire length of the shaft 2350), rather than engaging only upon energization. The keys can also be integral in the shape of the shaft 2350's cross-sectional shape, i.e., as long as the solenoid can impart rotation to the shaft. In the preferred construction, the engaging member 2355 includes peripheral gear teeth 2358 and are received within corresponding gear teeth 2308 in the engaging member 2305. The resulting mechanical couple allows a high degree of torque carrying capacity from the solenoid housing to the rotatable plate for purposes of rotating or translating objects with the drive pin, during energization of the solenoid.

Figure 21C:
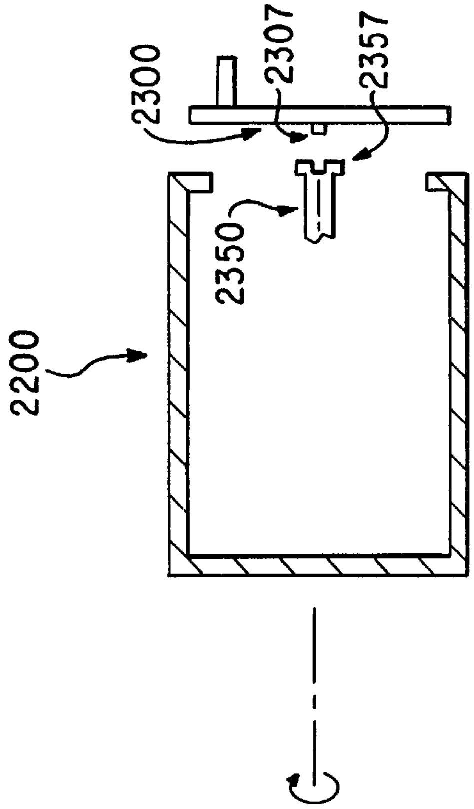
Figure 21D:
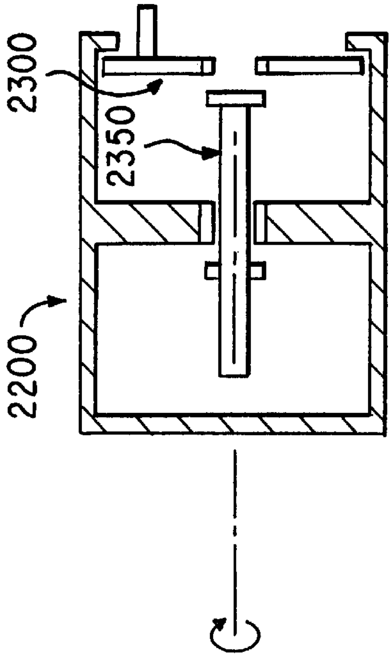

FIG. 21(C) shows an alternative embodiment, wherein the shaft 2350 includes an end bore 2357 and the cam 2300 includes a corresponding projection 2307, wherein the bore 2357 is extended to receive the projection 2307 upon energization of the solenoid 2200. FIG. 21(D) shows an alternative embodiment similar to that shown in FIG. 21(B), wherein the engaging element 2355 engages the engaging element 2305 upon energization by extending outward into engaging, rather than retracting into engagement.

The solenoid 2200 of the present invention is, thus, constructed to transmit torque upon energization for the purposes of, for example, rotating or translating objects. In particular, upon energization, rotation of the solenoid mechanically imparts a rotational force to the cam 2300 and applies a rotational force therethrough. The solenoid, thus, acts as a torque transmitting member. Although the shaft is preferably an elongated member as shown, the terminology "shaft" herein is intended to encompass any mechanical element(s) that is/are movable by a solenoid.

As noted, in the preferred embodiments, in an unenergized condition, the solenoid housing can be rotated, but the applied torque is not transmitted to the rotatable cam 2300, while in an energized condition, the shaft moves to an engaging position and, thus, torque can be applied through rotation of the solenoid. In addition, when a magnetic clutch solenoid is used, the magnetic force can cause the cam 2300 and solenoid to engage and, thus, torque can be applied through rotation of the solenoid.

The use of a torque transmitting solenoid has applicability in a variety of applications other than as shown with respect to the preferred embodiments herein. In brief, the torque transmitting solenoid can be used in any application to impart a torque or rotational force via a solenoid element. Although the illustrated embodiment pertains to transmission of a torque applied by hand via a hand-held key, the torque transmitting solenoid can be applied in a variety of devices, such as other devices having means for manually rotating the solenoid or having means for automatically rotating the solenoid. The solenoid of the present invention can be useful in any type of drive train or transmission.

The present invention has notable advantages in environments wherein a miniaturized torque transmitting component is desired. The most preferred environment pertains to electronic lock systems. The present solenoid can be useful in virtually all electronic lock systems, including, as some examples only, vending locks, ATM machine locks, pay telephone locks, parking meter locks, and door entrance locks. As other examples, it can be used in any cam locks, it can be used in any plug locks, it can be used in locks having tumbler pin systems, etc. The solenoid can, for example, be located within a drive train to allow the lock to be opened only upon energization of the solenoid. The energization of the solenoid can be effected through any known electronic accessing means. The present solenoid has notable advantages in electronic lock sets having doors that are openable via an torque-applying opening mechanism only upon electronic approval, such, as one example only, where a user slides an access card through a reader and then opens the door via a handle, knob, or lever. As some further examples, the solenoid can be used in the drive trains of lock devices like that shown in U.S. Pat. Nos. 4,163,215 to Iida and 4,148,092, the disclosures of which are incorporated herein by reference.

As generally shown at 2600 in FIGS. 19A and 19B, the device can include means, such as bearings or the like, to facilitate rotation of the plug, circuit, and solenoid within the cylindrical housing 2000. In addition, the plug 2500 can include means to allow the key means to be rotated therein. For example, a portion of the plug, e.g., a core portion, could be rotated within the plug 2500.

The rotated cam 2300 preferably also serves as a means to drive the bolt 2400 to the retracted position and to block the bolt when in the extended position. In this regard, the rotated cam 2300 can include a driver 2310 and a blocker 2320.

As shown in FIG. 18, the locking bolt 2400 preferably includes a cut-out portion 2410 across the width w, FIG. 20A, thereof. The cut-out portion 2410 is configured to receive the driver 2310 of the rotated cam 2300. Although the cut-out portion extends across the width w in the illustrated embodiments, the cut-out portion can extend across a portion thereof and/or can be curved or have an irregular shape, as long as the operation thereof remains similar A spring 2430 is preferably used to normally bias the locking bolt 2400 in an extended position. A variety of springs known in the art can be used, such as leaf springs, coil springs, etc.

The locking bolt 2400 can be moved from the extended position shown in FIG. 20B to the retracted position shown in FIG. 20A by rotating the cam 2300 clockwise in FIG. 20B. During this rotation, the driver 2310 contacts the surface 2411 to drive the locking bolt 2400 to the retracted position—e.g., against the force of the spring 2430. On the other hand, the locking bolt 2400 can be moved from a retracted position to an extended position, by rotating the cam 2300 counter-clockwise so that the driver 2310 moves generally in the direction A, FIG. 20A. Thus, allowing the spring 2430 to bias the locking bolt 2400 to the extended position.

The preferred embodiments of the invention include a blocker, or locking pin, 2320 which moves to a position below the surface 2412 of the locking bolt 2400 when the locking bolt 2400 is in the extended position. In this manner, the blocker 2320 provides the added security of a dead bolt. The blocker 2320 is preferably arranged to move to the side of the locking bolt 2400 when retracted as shown in FIG. 20A—such as in the environment where the cylinder 2000 is small, e.g., as with a standard N.A.M.A. lock. To facilitate movement of the blocker 2320 around the locking bolt 2400, the locking bolt 2400 can include a chamfered corner 2440, FIG. 20A. In this manner, when the locking bolt 2400 is in the extended position, the blocker 2320 can easily be rotated to a position behind the locking bolt as shown in FIG. 19C. In an alternative construction, the corner portion 2440 of the locking bolt can be squared off, and the blocker 2320 can be located closer to the locking bolt as shown at 2440-X and 2320-X in dotted lines in FIG. 20B. In alternative embodiments, the driver 2310 and the blocker 2320 can have other configurations, and the locking bolt 2400 can be appropriately configured to be compatible therewith. As one example, the blocker 2320 can be made to have a square, or other, cross-section. The configurations can be altered as long as the operation and relative positioning of the parts remains similar. For example, the driver 2310 preferably includes at least a portion located at a radius, e.g., r1, of the cam 2300 that remains within a cut-out section 2410 of the locking bolt 2400 while the blocker 2320 is preferably at a radius, e.g., r2, that allows the blocker 2320 to move around the locking bolt 2400.

The illustrated embodiments can operate with a single key that is inserted at each machine stop. On the other hand, traditional deadbolt designs require two key insertions, a first to open and a second to close the machine door. In addition, the illustrated embodiment enables spring latch convenience as well as the security of a dead bolt.

The preferred embodiments of the present invention enable a standard mechanical lock to easily be upgraded to having electronic control. For example, the embodiments shown in FIGS. 18–20 can be utilized within any lock having a T-handle regardless of the style thereof. Thus, the embodiments shown in FIGS. 18~20 have substantial benefits over the construction shown in FIGS. 15–17, which are not as easily adapted to a variety of devices. An existing mechanical pop-out cylinder can easily be replaced with a modified pop-out cylinder having electronic components as shown in FIGS. 18–20. The present invention contemplates a novel, easy and efficient method of upgrading mechanical locks by simply removing existing mechanical pop-out cylinders and replacing the same with an improved electronic pop-out cylinder according to the present invention. Thus, the embodiments illustrated in FIGS. 18–20 have substantial benefits and can be used in a variety of applications, such as with a variety of vending machines, bottle machines, ATM machines, etc.

In another alternative construction, the driver 2310 can be used to move the locking bolt to the extended position, rather than or in addition to using a spring 2430. In this regard, the cut-out section 2410 can be a narrower channel such that the driver 2310 moves the locking bolt in the directions A and B, FIG. 20A.

Although the preferred embodiments do not use common tumbler pins and keys having bitting surfaces, the key slot 2520 into the plug 2500 can be made to have a specific configuration that allows the insertion of only a particularly shaped key. The plug 2500 could also be modified to include multiple parts, where a certain part thereof is connected to the solenoid, such that a key means must rotate that certain part of the plug. Further, the plug 2500 could be modified to contain common tumbler pins operated by keys having bitting surfaces. In the environment where the cylinder 2000 is small, e.g., such as with a standard N.A.M.A. lock cylinder, the plug is very small and is preferably made without locking pins and/or separately moved parts.

The invention being thus described, it will be apparent to those skilled in the art that the same may be varied in many ways without departing from the spirit and scope of the invention. Any and all such modifications are intended to be included within the scope of the following claims.

What is claimed is:

1. An electronic lock security system, comprising:

i) an electronic lock, including:

a hollow cylinder;

an opening into said cylinder;

a bolt movable through said opening between an extended position and a retracted position;

a drive member within said cylinder, said drive member contacting said bolt to move said bolt to an unlocked position;

a solenoid within said hollow cylinder, said solenoid being engageable with said drive member;

an electronic lock circuit within said hollow cylinder;

a plug connected to said solenoid for rotating said solenoid, said plug having a key engagement for engagement of key means for rotating said plug; and ii) key means engageable with said key engagement and having electronic means for communicating with said electronic lock circuit to operate said lock.

2. The electronic lock security system according to claim 1, wherein said plug is fixedly connected to said solenoid such that said solenoid moves with said plug.

3. The electronic lock security system according to claim 1, wherein said solenoid includes a shaft that is moved when said solenoid is energized, said drive member is a cam member having a bore configured to receive said shaft, such that when said key means is engaged with said key engagement and said solenoid is energized, rotation of said key means results in simultaneous rotation of said cam member.

4. The electronic lock security system according to claim 1, wherein said shaft is moved in a direction to extend outward from said solenoid when said solenoid is energized.

5. The electronic lock security system according to claim 1, wherein said solenoid is a magnetic clutch solenoid that causes said drive member to be rotated via said solenoid by way of a magnetic engagement when said solenoid is energized.

6. The electronic lock security system according to claim 1, wherein said drive member is a cam member that includes a rotatable plate member and a drive portion mounted thereto, said drive portion being engageable with a surface of said locking bolt upon rotation of said rotatable plate member to move said locking bolt.

7. The electronic lock security system according to claim 6, wherein said solenoid includes a shaft that is moved when said solenoid is energized, said rotatable plate member having a bore configured to receive said shaft, such that when said key means is engageable with said key engagement and said solenoid is energized, rotation of said key means results in simultaneous rotation of said rotatable plate member and said drive portion.

8. The electronic lock security system according to claim 6, further including a blocker member mounted to said rotatable plate member, said blocker member being moved to a position behind said locking bolt when said locking bolt is extended to operate as a dead bolt.

9. The electronic lock security system according to claim 1, wherein said cylinder is sized to fit within a standard N.A.M.A. vending lock.

10. The electronic security system according to claim 1, wherein said electronic key means includes a key having a data contact, and said plug includes a terminal for contacting said data contact of said key.

11. The electronic security system according to claim 1, wherein said key means includes a handheld computer having means for storing encoded data and an internal circuit board installed within said handheld computer for interfacing said handheld computer with said lock, a key device coupled to said internal circuit board via an I/O port of said handheld computer, said key device being insertable into said lock and providing operative power to said lock from said handheld computer, providing data to said lock from said handheld computer, and providing data from said lock to said handheld computer.

12. The electronic lock security system according to claim 3, wherein said electronic lock circuit includes means for receiving data from said key means, means for determining whether data received from said key means is authorized data, and means for energizing said solenoid means when data received from said key means is determined to be authorized data.

13. The electronic lock security system of claim 1, wherein said key engagement includes a keyway slot formed in said plug and said key means includes a key blade that is insertable within said slot.

14. An electronic lock device, comprising:

i) a lock including a mechanical drive train for opening an access door;

ii) an electronic device for electronically controlling access through the access door;

iii) said electronic device including a solenoid situated within said mechanical drive train;

iv) said solenoid having a housing that is rotated as a part of said drive train, said solenoid engaging a drive member upon energization of said solenoid, such that rotation of said solenoid when energized causes said drive member to simultaneously rotate to connect said drive train and to allow access through said access door.

15. The electronic lock device according to claim 14, wherein said solenoid has a movable shaft member that has an engaging member which engages a corresponding engaging member of said drive member upon engergization of said solenoid.

16. The electronic lock device according to claim 14, wherein said solenoid operates as a magnetic clutch to magnetically engage said drive member.

17. The electronic lock device according to claim 14, wherein said mechanical drive train includes a manual actuator that is manually operated by a user and a locking bolt that is moved by way of said drive member when said solenoid is energized.

18. The electronic lock device according to claim 17, wherein said manual actuator is selected from the group consisting of a lever, a knob and a handle.

19. The electronic lock device according to claim 14, wherein said access door is a door of a building through which an individual walks.

20. The electronic lock device according to claim 14, wherein said access door is a door of a device having an enclosed housing into which a user requires manual access.

21. An electronic locking system, comprising:

a drive member movable between locking and unlocking positions;

an electronic lock circuit within said locking system;

a plug having a key engagement for engaging a key means for rotating said plug;

key means engageable with said key engagement and having electronics for communicating with said electronic lock circuit to operate said locking system; and a solenoid controlled via said electronic lock circuit that is connected to rotate with said plug and that is engageable with said drive member so as to move said drive member via said plug between said locking and unlocking positions.

* * * * *